United States Patent
Chen

(10) Patent No.: US 11,700,647 B2
(45) Date of Patent: *Jul. 11, 2023

(54) METHOD AND TERMINAL FOR COUNTING PREAMBLE RETRANSMISSION IN RANDOM ACCESS PROCEDURE

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 35 days.

This patent is subject to a terminal disclaimer.

(21) Appl. No.: 17/410,152

(22) Filed: Aug. 24, 2021

(65) Prior Publication Data

US 2021/0385874 A1 Dec. 9, 2021

Related U.S. Application Data

(63) Continuation of application No. 16/623,379, filed as application No. PCT/CN2018/090803 on Jun. 12, 2018, now Pat. No. 11,140,719.

(30) Foreign Application Priority Data

Jun. 16, 2017 (CN) .......................... 201710459794.1

(51) Int. Cl.
*H04W 74/08* (2009.01)
*H04L 1/1829* (2023.01)
(Continued)

(52) U.S. Cl.
CPC ....... *H04W 74/0833* (2013.01); *H04L 1/1858* (2013.01); *H04W 52/362* (2013.01);
(Continued)

(58) Field of Classification Search
None
See application file for complete search history.

(56) References Cited

U.S. PATENT DOCUMENTS 9,955,437 B2* 4/2018 Takeda ................... H04W 52/48
10,477,577 B2* 11/2019 Jeon ..................... H04W 52/325
(Continued)

FOREIGN PATENT DOCUMENTS

| CN | 102067704 A | 5/2011 |
|----|-------------|--------|
| CN | 102939733 A | 2/2013 |

(Continued)

OTHER PUBLICATIONS

Discussion and decision document for 3GPP TSG RAN WG1 Meeting #88 on RACH procedure for multi-Tx beam operation is Dated from Feb. 13-Feb. 17, 2017, 4 Pages.

(Continued)

*Primary Examiner* — Faiyazkhan Ghafoerkhan
(74) *Attorney, Agent, or Firm* — . Brooks Kushman P.C.

(57) ABSTRACT

The present disclosure provide a method and terminal for counting preamble retransmission in a random access procedure. The method includes: in a random access procedure, when detecting that no Random Access Response (RAR) is received or contention resolution fails, counting a number of times of retransmission of a preamble and/or a number of times of power ramping of transmission of the preamble according to a configured counter/counters.

20 Claims, 2 Drawing Sheets

(51) Int. Cl.
H04W 52/36 (2009.01)
H04W 74/00 (2009.01)
H04W 80/02 (2009.01)

(52) U.S. Cl.
CPC ....... *H04W 52/367* (2013.01); *H04W 74/008* (2013.01); *H04W 80/02* (2013.01)

(56) References Cited

U.S. PATENT DOCUMENTS

| | | | | |
|---|---|---|---|---|
| 10,568,050 | B2* | 2/2020 | Jeon | H04W 74/0833 |
| 10,575,338 | B2* | 2/2020 | Park | H04W 72/0446 |
| 10,681,738 | B2* | 6/2020 | Babaei | H04W 74/0833 |
| 11,140,719 | B2* | 10/2021 | Chen | H04W 52/362 |
| 2011/0299415 | A1 | 12/2011 | He et al. | |
| 2013/0035084 | A1* | 2/2013 | Song | H04W 52/48 |
| | | | | 455/418 |
| 2014/0349712 | A1* | 11/2014 | Shukla | H04W 74/0833 |
| | | | | 455/571 |
| 2015/0036617 | A1* | 2/2015 | Guo | H04W 52/50 |
| | | | | 370/329 |
| 2016/0212770 | A1* | 7/2016 | Lee | H04B 7/2612 |
| 2016/0234861 | A1* | 8/2016 | Ye | H04W 74/0808 |
| 2016/0302080 | A1* | 10/2016 | Hwang | H04B 7/0413 |
| 2017/0231011 | A1* | 8/2017 | Park | H04W 72/0446 |
| 2017/0303212 | A1* | 10/2017 | Takeda | H04W 16/32 |
| 2018/0176961 | A1* | 6/2018 | Babaei | H04W 74/0833 |
| 2018/0324716 | A1* | 11/2018 | Jeon | H04W 74/0833 |
| 2018/0324853 | A1* | 11/2018 | Jeon | H04W 52/04 |
| 2019/0239087 | A1* | 8/2019 | Hwang | H04L 1/08 |
| 2019/0261195 | A1* | 8/2019 | Cheng | H04W 76/27 |
| 2019/0281634 | A1* | 9/2019 | Takahashi | H04W 74/08 |
| 2019/0289544 | A1 | 9/2019 | Yi et al. | |
| 2019/0313451 | A1* | 10/2019 | Liu | H04W 72/0446 |
| 2019/0342925 | A1* | 11/2019 | Zhang | H04W 74/006 |
| 2020/0045650 | A1* | 2/2020 | Suzuki | H04W 52/36 |
| 2020/0112999 | A1* | 4/2020 | Lee | H04L 69/324 |
| 2020/0146057 | A1* | 5/2020 | Jeon | H04W 52/325 |
| 2020/0178185 | A1* | 6/2020 | Jeons | H04W 74/0833 |
| 2020/0187261 | A1* | 6/2020 | Chen | H04W 52/367 |
| 2020/0196357 | A1* | 6/2020 | Park | H04W 72/0446 |
| 2020/0205202 | A1* | 6/2020 | Takahashi | H04W 16/28 |
| 2020/0296765 | A1* | 9/2020 | Kim | H04W 72/30 |
| 2020/0296772 | A1* | 9/2020 | Babaei | H04W 74/0833 |
| 2020/0305197 | A1* | 9/2020 | Kim | H04W 56/0015 |
| 2021/0068167 | A1* | 3/2021 | Hoglund | H04W 74/0833 |
| 2021/0153244 | A1* | 5/2021 | Ohara | H04W 52/48 |
| 2021/0385873 | A1* | 12/2021 | Chen | H04L 1/1858 |
| 2021/0385874 | A1* | 12/2021 | Chen | H04W 52/362 |

FOREIGN PATENT DOCUMENTS

| | | |
|---|---|---|
| CN | 103782647 A | 5/2014 |
| CN | 105580292 A | 5/2016 |
| CN | 105873229 A | 8/2016 |
| WO | 2010105518 A1 | 9/2010 |
| WO | 2016053179 A1 | 4/2016 |
| WO | 2016161408 A1 | 10/2016 |
| WO | 2017022902 A1 | 2/2017 |

OTHER PUBLICATIONS

Discussion and decision document for 3GPP TSG-RAN WG1 Meeting #88 on NR Random Acess is Dated from Feb. 13-Feb. 17, 2017, 4 Pages.
Discussion and decision document for 3GPP TSG-RAN WG1 Meeting #88Bis on RACH retransmission is Dated from Apr. 3-Apr. 7, 2017, 8 Pages.
Discussion and decision document for 3GPP TSWG1 Meeting #89 on NR 4-Step RACH procedure is Dated from May 15-May 19, 2017, 11 Pages.
Europeon Search report for Application No. 18818907.0-1215/3641475, Patent No. PCT/CN2018090803 dated on May 19, 2020, 10 Pages.
International Search Report and Written for Application No. PCT/CN2018/090803, dated Dec. 26, 2019, 6 Pages.
NPL document of 3GPP TS 36.321, vol. 12.9.0, dated on Mar. 2016, 4 Pages.
Office action for Chinese Application No. 201710459794.1 dated Jun. 18, 2020, 10 Pages.
Office action for U.S. Appl. No. 16/623,379 dated Apr. 2, 2021, 27 Pages.
Search Report for Chinese Application No. 201710459794.1 dated Apr. 17, 2019, 4 Pages.
First Office Action for Chinese Application No. 202110954753.6, dated Dec. 19, 2022, 9 Pages.

* cited by examiner

METHOD AND TERMINAL FOR COUNTING PREAMBLE RETRANSMISSION IN RANDOM ACCESS PROCEDURE

CROSS-REFERENCE TO RELATED APPLICATION

This application is a continuation of U.S. patent application Ser. No. 16/623,379 which is the U.S. national phase of PCT Application PCT/CN2018/090803 filed on Jun. 12, 2018, which claims the benefit and priority of Chinese Application No. 201710459794.1, filed on Jun. 16, 2017, which is incorporated by reference in its entirety.

TECHNICAL FIELD

The present disclosure relates to the field of communication technology, and more particularly to a method and terminal for counting preamble retransmission in a random access procedure.

BACKGROUND

A Random Access Channel (RACH) is an uplink transmission channel. The RACH is received in the whole cell and the RACH is usually used to perform PAGING reply and Mobile Station (MS) originating call/login access, etc.

Trigger conditions of the random access include: (1) RRC_IDLE initial access; (2) initial access when the wireless link is disconnected; (3) random access is required during switching; (4) the random access procedure is required in RRC_CONNECTED state and when Downlink (DL) data is received, for example, when a Uplink (UL) synchronization state is "asynchronous"; (5) the random access procedure is required in RRC_CONNECTED state and when UL data is received, for example, when a UL synchronization state is "asynchronous" or there is no PUCCH resource available for scheduling.

The random access procedures include a contention-free based random access procedure and a contention based random access procedure.

The contention-free based random access procedure includes two steps:
1. a User Equipment (UE) transmits to a base station a random access preamble, which is also referred as msg.1;
2. the UE receives from the base station a Random Access Response (RAR), which is also referred as msg.2.

The contention based random access procedure includes following steps:
1. a User Equipment (UE) transmits to a base station a random access preamble, which is also referred as msg.1;
2. the UE receives from the base station a Random Access Response (RAR), which is also referred as msg.2.
3. the UE transmits to the base station a contention resolution request, which is also referred as msg.3;
4. the UE receives from the base station a contention resolution result, which is also referred as msg.4.

In the fifth-Generation (5G) New Radio (NR) system, in the design of the current random access, each re-transmission of the random access preamble supports power ramping.

In the Long Term Evolution (LTE) system, a preamble transmission counter, i.e., PREAMBLE_TRANSMISSION_ COUNTER is used to count a number of times of preamble retransmission and used to perform power ramping.

Each time the random access procedure is initialized, the counter is reset to 1.

When the msg.2, i.e., RAR is not correctly received and a power ramping suspension instruction transmitted from an underlying physical layer is not received, the counter adds 1.

When the contention resolution fails and the power ramping suspension instruction transmitted from the underlying physical layer is not received, the counter adds 1.

In the above processes, when the value of the counter reaches a maximum number of times of preamble retransmission plus 1, the Media Access Control (MAC) layer notifies an upper layer of the random access problem or the random access failure.

The power of each preamble transmission is calculated using the following formula according to the step size of the counter and the power ramping:

PREAMBLE_RECEIVED_TARGET_POWER=preambleInitialReceiv edTargetPower+DELTA_PREAMBLE+ (PREAMBLE_TRANSMISSION_COUNTE R−1)*powerRampingStep; where PREAMBLE_RECEIVED_TARGET_POWER denotes a target power value, preambleInitialReceivedTargetPower denotes an original power value, DELTA_PREAMBLE denotes a preset fixed value, PREAMBLE_TRANSMISSION_COUNTER denotes the value of a current preamble transmission counter and powerRampingStep denotes the step size of the power ramping.

In the LTE, the same counter is used to count the power climb and the number of times of preamble transmission. In other words, the preamble transmission counter is used to count both the number of times of power ramping and the number of times of preamble transmission.

The introduction of the Massive Multiple Input Multiple Output (MIMO) antenna in the 5G NR system gives the concept of beam. The UE can choose a different beam to transmit the preamble each time the preamble is re-transmitted. The current conclusion is that when the UE performs beam switching, the count for the power ramping remains unchanged. When the UE does not change the beams during each re-transmission, the count for the power ramping increases. Therefore, the existing single counter that is used for counting both the power ramping and preamble transmission cannot work. That is, the existing single counter cannot meet the functions of counting both the power ramping and preamble transmission, and cannot guarantee the reliability of communication of the NR system.

SUMMARY

Embodiments of the present disclosure provide a method for counting preamble retransmission in a random access procedure, including:

in a random access procedure, when detecting that no Random Access Response (RAR) is received or contention resolution fails, counting a number of times of retransmission of a preamble and/or a number of times of power ramping of transmission of the preamble according to a configured counter/counters.

Embodiments of the present disclosure further provide a terminal, including:

a processing module configured to, in a random access procedure, when detecting that no Random Access Response (RAR) is received or contention resolution fails, counting a number of times of retransmission of a preamble and/or a number of times of power ramping of transmission of the preamble according to a configured counter/counters.

Embodiments of the present disclosure further provide a terminal, including: a storage, processor and computer programs which are stored in the storage and run on the processor. The computer programs are executed by the processor to implement steps of the above method for counting preamble retransmission in a random access procedure.

Embodiments of the present disclosure further provide a computer readable storage medium including computer programs stored therein. The computer programs are executed by the processor to implement steps of the above method for counting preamble retransmission in a random access procedure.

DETAILED DESCRIPTION

The present disclosure will be described in details hereinafter with reference to accompanying drawings and embodiments to make the objective, technical solutions and merits therein clearer.

As for the problem of being unable to simultaneously satisfy the functions of counting the power ramping and preamble transmission and guarantee the reliability of the communication of the NR system when a single counter is used for counting both the power ramping and preamble transmission, embodiments of the present disclosure provides a method and terminal for counting preamble retransmission in a random access procedure.

Figure 1:
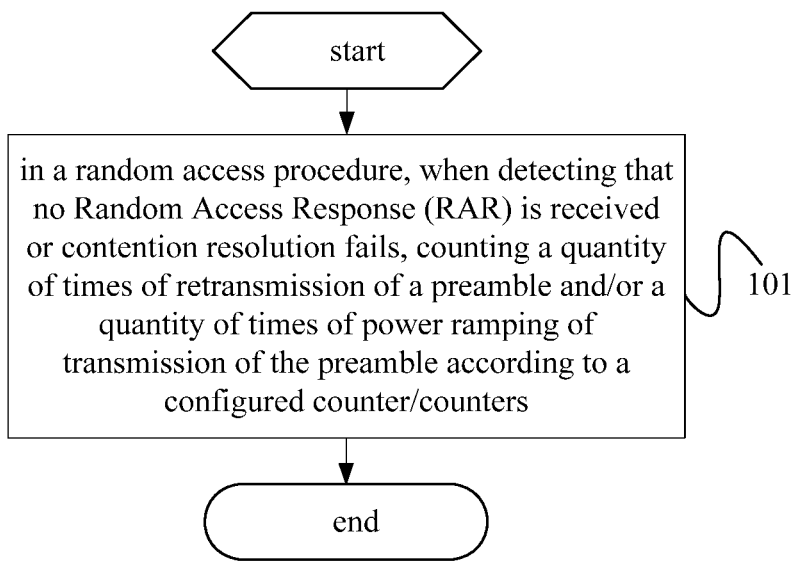
FIG. 1 is a flow chart illustrating a method for counting preamble retransmission in a random access procedure according to various embodiments of the present disclosure.

As shown in FIG. 1, the method for counting preamble retransmission in a random access procedure in embodiments of the present disclosure includes:

Block 101, in a random access procedure, when detecting that no Random Access Response (RAR) is received or contention resolution fails, counting a number of times of preamble retransmission and/or a number of times of power ramping of preamble transmission according to a configured counter/counters.

It should be noted that the counters in embodiments of the present disclosure may include a preamble transmission counter configured for the UE, i.e., PREAMBLE_TRANSMISSION_COUNTER, a beam preamble re-transmission counter configured for the beam, i.e., PREAMBLE_TRANSMISSION_COUNTER_BEAM, a power ramping counter configured for the power ramping, i.e., POWER_RAMPING_COUNTER, a preamble re-transmission beam switching counter configured for the beam switching, i.e., PREAMBLE_BEAM_SWITCH_COUNTER and a power level preamble transmission counter configured for the power level, i.e., PREAMBLE_TRANSMISSION_COUNTER_PL. It should be noted that the preamble transmission counter, the beam preamble re-transmission counter, the power ramping counter and the preamble re-transmission beam switching counter (or the power level preamble transmission counter) belong to different types of counters and the preamble re-transmission beam switching counter and the power level preamble transmission counter are counters that cannot exist simultaneously.

Each counter is described in details hereinafter respectively according to the types of the counters configured in the terminal.

First, only one type of counter is configured in the terminal when only one type of counter is configured in the terminal and no RAR message is received or the contention resolution fails, the counter adds 1; or, when no RAR message is received or the contention resolution fails, and when a power ramping suspension instruction which is used to instruct a Medium Access Control (MAC) layer by a physical layer is not received, the counter adds 1.

1. Only the Preamble Transmission Counter is Configured in the Terminal

The preamble transmission counter is configured for each terminal, that is, each terminal includes only one preamble transmission counter. When the preamble transmission counter is initialized or reset in each random access procedure, the preamble transmission counter is reset to 1 or 0. Further, when the RAR message is not received in preset time or the contention resolution fails, the preamble transmission counter adds 1. It should be noted that the preset time period refers to an RAR window, i.e., an RAR time window.

When a count value of the preamble transmission counter reaches a first preset maximum number of times of transmission Max1 or Max1+1, the upper layer is notified of a random access problem or failure of the random access procedure (i.e., random access failure) via the MAC layer.

It should be noted that the upper layer refers to a Radio Link Control (RLC) layer, a Radio Resource Control (RRC) layer, a network layer or an application layer etc., on the physical layer.

It should be noted that in this situation, the situation for configuring the power ramping of the random access preamble retransmission includes:

when the preamble transmission counter counts the preamble retransmission, when two adjacent transmissions of the preamble use a same beam, adding one step size to a transmission power; or, when the two adjacent transmissions of the preamble use the same beam and the power ramping suspension instruction which is used to instruct the MAC layer by the physical layer is not received, adding one step size to the transmission power;

otherwise, keeping the transmission power unchanged.

The step size is configured by the base station for the terminal (the base station configures the step size for the terminal via a dedicated Radio Resource Control (RRC) message, RRC configuration, RRC re-configuration, System Information (SI) or a broadcast message, etc.) or determined according to a preset rule (i.e., a protocol).

It should be noted that in the power ramping process, when an obtained transmission power is larger than or equals the maximum transmission power, the method further includes:

transmitting, by the terminal, the preamble according to the maximum power; and/or instructing power ramping suspension.

It should be noted that the power ramping suspension instruction is used to instruct the MAC layer by the physical layer of the terminal. There may be other physical layer triggering conditions for the power ramping suspension instruction, such as when temporarily dropping a random access procedure (this scenario may occur when the random access conflicts).

2. Only the Beam Preamble Retransmission Counter is Configured in the Terminal

The beam preamble retransmission counter is configured for the beam, that is, the terminal may include only one beam preamble retransmission counter and also may include multiple beam preamble retransmission counters (that is, one beam preamble retransmission counter may be configured for each beam and one beam preamble re-transmission counter may be configured for some beams). Each time the random access procedure is initialized or reset, the beam preamble retransmission counter is reset to 1 or 0.

The count rule of the beam preamble retransmission counter may be configured using following one or multiple modes.

1) When the random access preamble is transmitted on a first beam and no RAR message is received in preset time, a beam preamble retransmission counter configured based on the first beam adds 1.

That is, the random access preamble (i.e., msg. 1) is transmitted on a beam. When no RAR message is received in the RAR window, the count value of the beam preamble retransmission counter corresponding to the beam adds 1.

2) When a random access message three (i.e., msg. 3, i.e., a message, which is transmitted to the base station by the terminal in the random access procedure and is relevant to the scheduling transmission) is transmitted on a second beam and the contention resolution fails, a beam preamble retransmission counter configured based on the second beam adds 1.

That is, the terminal transmits the msg. 3 on a beam. When the contention resolution fails, the beam preamble retransmission counter corresponding to the beam adds 1.

3) When the random access preamble is transmitted on a third beam, the random access message three is transmitted on a fourth beam and the contention resolution fails, a beam preamble retransmission counter configured based on the third beam adds 1.

That is, the msg. 1 is transmitted on one beam and the msg. 3 (the beam of which may be the same as or may be different from that of the msg. 1) is transmitted on another beam. When the contention resolution fails, the beam preamble retransmission counter corresponding to the beam, which is used to transmit the msg. 1, adds 1.

4) When the random access preamble is transmitted on the third beam, the random access message three is transmitted on a fourth beam and the contention resolution fails, the beam preamble retransmission counter configured based on the third beam and a beam preamble retransmission counter configured based on the fourth beam respectively add one.

That is, the msg. 1 is transmitted on one beam and the msg. 3 (the beam of which may be the same as or may be different from that of the msg. 1) is transmitted on another beam. When the contention resolution fails, the beam preamble retransmission counter corresponding to the beam, which is used to transmit the msg. 1, and the beam preamble retransmission counter corresponding to the beam, which is used to transmit the msg. 3, respectively add one.

It should be noted that the above 2), 3) and 4) situations are parallel situations and one of the above situations may be chosen in use.

It should be noted that when a count value of the beam preamble retransmission counter reaches a second preset maximum number of times of transmission Max2 or Max2+ 1, the method further includes:

when a next retransmission of the random access preamble is performed in this random access procedure, switching beams; or, when the next retransmission of the random access preamble is performed in this random access procedure, removing a beam, which is used to perform previous transmission of the random access preamble, from candidate beams for next retransmission of the random access preamble; or, notifying an upper layer of a random access problem or failure of the random access procedure via the MAC layer.

Specifically, when the next retransmission of the random access preamble is performed in this random access procedure, the first implementation mode for removing the beam, which is used to perform the previous transmission of the random access preamble from the candidate beams for the next retransmission of the random access preamble, includes:

in preset time or preset number of times, removing the beam, which is used to perform the previous transmission of the random access preamble from the candidate beams for the next retransmission of the random access preamble.

That is, when the count value of the beam preamble retransmission counter reaches the preset maximum value, in the preset time or preset number of times of retransmission, the beam, which is used to perform the previous retransmission, is no longer used to perform the next retransmission.

In the first implementation, when reaching the preset time or preset number of times, the terminal may select restarting the beam preamble retransmission counter.

Specifically, when the next retransmission of the random access preamble is performed in this random access procedure, the second implementation mode of removing the beam, which is used to perform the previous transmission of the random access preamble from the candidate beams for the next retransmission of the random access preamble, includes:

when transmission powers of the terminal are in a same power level or a preset number of power levels, removing the beam, which is used to perform the previous transmission of the random access preamble from the candidate beams for the next retransmission of the random access preamble.

That is, when the count value of the beam preamble retransmission counter reaches the maximum value, in the same power level or the preset number of power levels, the beam, which is used to perform the previous retransmission, is no longer used to perform next retransmission.

In the first implementation, when the transmission powers of the terminal exceed the same power level or the preset number of power levels, the terminal may select to restart the beam preamble re-transmission counter.

When multiple beam preamble retransmission counters exist in the terminal, the specific usage situations of the multiple beam preamble retransmission counter includes:

1) when count values of a first preset number of beam preamble retransmission counters reach a third preset maximum number of times of transmission Max3 or Max3+1, notifying an upper layer of a random access problem or failure of the random access procedure via the MAC layer.

The first preset number refers to a number of beam preamble retransmission counters corresponding to all beams of the terminal or refers to a number of beam preamble retransmission counters corresponding to some beams of the terminal.

2) When a sum of count values of a second preset number of beam preamble retransmission counters reaches the third preset maximum number of times of transmission Max3 or Max3+1, notifying an upper layer of a random access problem or failure of the random access procedure via the MAC layer.

The second preset number refers to a number of beam preamble retransmission counters corresponding to all beams of the terminal or refers to a number of beam preamble retransmission counters corresponding to some beams of the terminal.

It should be noted that in this situation, the configuration situation of power ramping of retransmission of the random access preamble includes:

when two adjacent transmissions of the preamble use a same beam, adding one step size to a transmission power; or, when the two adjacent transmissions of the preamble use the same beam and the power ramping suspension instruction which is used to instruct the MAC layer by the physical layer is not received, adding one step size to the transmission power;

otherwise, keeping the transmission power unchanged.

The step size is configured by the base station for the terminal or determined according to a preset rule.

It should be noted that in the power ramping process, when an obtained transmission power is larger than or equals the maximum transmission power, the method further includes:

transmitting, by the terminal, the random access preamble according to the maximum power.

3. Only the Power Ramping Counter is Configured in the Terminal

The power ramping counter is configured for a number of times of the power ramping. The power ramping counter is reset to 1 or 0 each time the random access procedure is initialized or reset.

Specifically, when any of not correctly receiving the RAR message in preset time, failure of contention resolution and retransmission of the preamble occurs and two adjacent transmissions of the preamble use a same beam, the power ramping counter adds 1; or, when any of not correctly receiving the RAR message in the preset time, failure of contention resolution and retransmission of the preamble occurs, two adjacent transmissions of the preamble use the same beam and the power ramping suspension instruction which is used to instruct the MAC layer by the physical layer is not received, the power ramping counter adds 1.

It should be noted that one power ramping counter may be configured for each terminal and the power ramping counter may be configured for the beam. When the power ramping counter is configured for the beam, the power ramping counter is configured based on a single beam and the beams are switched at each re-transmission, the power ramping counter corresponding to the current beam is reset to a value of the power ramping counter corresponding to a transmission beam, which is used to perform the previous transmission of the random access preamble, which guarantees that when the terminal switches the beams, the value of the power ramping counter remains unchanged.

It should be noted that in this situation, the configuration situation of power ramping of the retransmission of the random access preamble includes:

obtaining a transmission power of retransmission after ramping according to a formula PREAMBLE_RECEIVED_TARGET_POWER=preambleInitialReceivedTargetPower+DELTA_PREAMBLE+(POWER_RAMPING_COUNTER−1)*powerRampingStep;

where PREAMBLE_RECEIVED_TARGET_POWER denotes a target power value, preambleInitialReceivedTargetPower denotes an original power value, DELTA_PREAMBLE denotes a preset fixed value, POWER_RAMPING_COUNTER denotes a value of the current power ramping counter and powerRampingStep denotes a power ramping step size;

the power ramping step size is configured by the base station for the terminal (the base station configures the step size for the terminal via a dedicated Radio Resource Control (RRC) message, RRC configuration, RRC re-configuration, System Information (SI) or a broadcast message, etc.) or determined by a preset rule (i.e., a protocol).

It should be noted that in the power ramping process, when a transmission power obtained via calculation is larger than or equals the maximum power, the method further includes:

transmitting, by the terminal, the random access preamble according to the maximum power.

It should be noted that when a count value of the power ramping counter reaches the maximum number or the maximum number plus 1 and when not correctly receiving the RAR messages or contention resolution failure occurs for a preset number of times in the present time, an upper layer is notified of a random access problem or failure of the random access procedure via the MAC layer.

4. Only a Preamble Retransmission Beam Switching Counter or a Power Level Preamble Transmission Counter are Configured in the Terminal The preamble retransmission beam switching counter or power level preamble transmission counter is reset to 1 or 0 each time the random access procedure is initialized or reset. When beams are switched when the random access preamble is re-transmitted, the preamble retransmission beam switching counter or power level preamble transmission counter adds 1.

When the preamble retransmission beam switching counter or power level preamble transmission counter reaches the preset maximum number Max4 or Max4+1, one of the following processes is executed:

1) performing power ramping when re-transmitting the random access preamble and resetting the preamble retransmission beam switching counter or power level preamble transmission counter;

2) at next retransmission of the random access preamble, keeping beams un-switched; or 3) at the next retransmission of the random access preamble, switching to a beam, which has not been used to transmit the random access preamble, to re-transmit the random access preamble.

It should be noted that an implementation mode of switching to the beam, which has not been used to transmit the random access preamble, to re-transmit the random access preamble includes:

switching to a beam that is in a same power level or preset number of power levels with the current beam and has not been used to transmit the random access preamble, to re-transmit the random access preamble.

It should be noted that when the transmission power used by the terminal for transmitting the preamble changes, the preamble retransmission beam switching counter or power level preamble transmission counter require to be reset.

Specifically, when the preamble retransmission beam switching counter or power level preamble transmission counter reaches the maximum count value and a current transmission power of the terminal reaches the maximum transmission power, an upper layer is notified of a random access problem or failure of the random access procedure via the MAC layer.

Second, at least two types of counters are configured in the terminal

When at least two types of counters are configured in the terminal, when the counters reach the maximum counting quantities, an upper layer is notified of a random access problem or failure of the random access procedure via the MAC layer.

1. The Terminal is Configured with a Preamble Transmission Counter and a beam preamble retransmission counter.

It should be noted that when the preamble transmission counter and the beam preamble retransmission counter are initialized or reset in each random access procedure, both the preamble transmission counter and the beam preamble retransmission counter are reset to 1 or 0.

The count rule of the beam preamble retransmission counter is configured via one or multiple of the following modes.

1) When the random access preamble is transmitted on a first beam and no RAR message is received in preset time, a beam preamble retransmission counter configured based on the first beam adds 1.

2) When a random access message three (i.e., msg. 3, i.e., the message, which is transmitted to the base station from the terminal and is associated with the scheduling transmission in the random access procedure) is transmitted on a second beam and when the contention resolution fails, the beam preamble retransmission counter configured based on the second beam adds 1.

3) When the random access preamble is transmitted on a third beam, the random access message three is transmitted on a fourth beam and the contention resolution fails, a beam preamble retransmission counter configured based on the third beam adds 1.

4) When the random access preamble is transmitted on the third beam, the random access message three is transmitted on the fourth beam and the contention resolution fails, the beam preamble retransmission counter configured based on the third beam and a beam preamble retransmission counter configured based on the fourth beam respectively add 1.

It should be noted that the above 2), 3) and 4) situations are parallel situations and one of the above situations may be chosen in use.

In this situation, when a count value of the beam preamble retransmission counter reaches a second preset maximum number of times of transmission Max2 or Max2+1, the method further includes:

when next retransmission of the random access preamble is performed in this random access procedure, switching beams;

when the next retransmission of the random access preamble is performed in this random access procedure, removing a beam, which is used to perform previous transmission of the random access preamble from candidate beams for the next retransmission of the random access preamble; or notifying an upper layer of a random access problem or failure of the random access procedure via the MAC layer.

It should be noted that in this situation, the configuration situation of power ramping of the retransmission of the random access preamble includes:

when two adjacent transmissions of the preamble use a same beam, adding one step size to the transmission power; or when the two adjacent transmissions of the preamble use the same beam and the power ramping suspension instruction which is used to instruct the MAC layer by the physical layer is not received, adding one step size to the transmission power;

otherwise, keeping the transmission power unchanged.

The step size is configured by the base station for the terminal or determined according to a preset rule.

It should be noted that in the power ramping process, when an obtained transmission power is larger than or equals the maximum transmission power, the method further includes:

transmitting, by the terminal, the random access preamble according to the maximum power.

In this situation, when the count value of the preamble transmission counter reaches a first preset maximum number of times of transmission Max1 or Max1+1, an upper layer is notified of a random access problem or failure of the random access procedure via the MAC layer;

when count values of a first preset number of beam preamble retransmission counters reach a third preset maximum number of times of transmission Max3 or Max3+1, the upper layer is notified of the random access problem or the failure of the random access procedure via the MAC layer; or when a sum of count values of a second preset number of beam preamble retransmission counters reaches the third preset maximum number of times of transmission Max3 or Max3+1, the upper layer is notified of the random access problem or the failure of the random access procedure via the MAC layer.

2. A Preamble Transmission Counter and a Power Ramping Counter are Configured in the Terminal It should be noted that when the preamble transmission counter and the power ramping counter are initialized or reset in each random access procedure, both the preamble transmission counter and the power ramping counter are reset to 1 or 0.

Specifically, when the RAR message is not correctly received in preset time or the contention resolution fails, the preamble transmission counter adds 1.

Further, when a count value of the preamble transmission counter reaches a first preset maximum number of times of transmission Max1 or Max1+1, an upper layer is notified of a random access problem or failure of the random access procedure via the MAC layer.

Optionally, the power ramping of the retransmission of the random access preamble is configured using following modes:

when the preamble transmission counter counts the preamble retransmission, when two adjacent transmissions of the preamble use a same beam, adding one step size to a transmission power; or when the two adjacent transmissions of the preamble use the same beam and the power ramping suspension instruction which is used to instruct the MAC layer by the physical layer is not received, adding one step size to the transmission power;

otherwise, keeping the transmission power unchanged.

The step size is configured by the base station for the terminal or determined according to a preset rule.

In this situation, the configuration situation of the power ramping counter includes:

when any of not correctly receiving the RAR message, contention resolution failure and retransmission of the preamble occurs in the preset time and two adjacent transmissions of the preamble use a same beam, adding 1 to the power ramping counter; or when any of not correctly receiving the RAR message, contention resolution failure and retransmission of the preamble occurs in the preset time, two adjacent transmissions of the preamble use the same beam and the power ramping suspension instruction which is used to instruct the MAC layer by the physical layer is not received, adding 1 to the power ramping counter.

It should be noted that when the power ramping counter is configured based on a single beam and when the beams are switched at each retransmission, the value of the power ramping counter corresponding to the current beam is reset to that of the power ramping counter corresponding to a transmission beam, which is used to perform the previous transmission of the random access preamble.

Therefore, in this situation, when the terminal has the power ramping counter and when the ramping power is determined, following modes are preferred:

obtaining a transmission power of retransmission after ramping according to a formula PREAMBLE_ RECEIVED_TARGET_POWER=preambleInitialReceivedTarget Power r+DELTA_PREAMBLE+(POWER_RAMPING_ COUNTER−1)*powerRampingStep;

where PREAMBLE_RECEIVED_TARGET_POWER denotes a target power value, preambleInitialReceivedTargetPower denotes an original power value, DELTA_PREAMBLE denotes a preset fixed value, POWER_RAMPING_ COUNTER denotes a value of the current power ramping counter and powerRampingStep denotes a power ramping step size;

the power ramping step size is configured by the base station for the terminal or determined by a preset rule.

In this situation, when a transmission power obtained via calculation is larger than or equals the maximum power, the method further comprises:

transmitting, by the terminal, the random access preamble according to the maximum power.

3. A beam Preamble Retransmission Counter and a Power Ramping Counter are Configured in the Terminal It should be noted that when the beam preamble retransmission counter and power ramping counter are initialized or reset in each random access procedure, both the beam preamble retransmission counter and power ramping counter are reset to 1 or 0.

The configuration situation of the beam preamble retransmission counter includes:

when the random access preamble is transmitted on a first beam and the RAR message is not correctly received in the preset time, adding 1 to a beam preamble retransmission counter configured based on the first beam;

when a random access message three is transmitted on a second beam and the contention resolution fails, adding 1 to a beam preamble retransmission counter configured based on the second beam; or when the random access preamble is transmitted on the third beam, the random access message three is transmitted on a fourth beam and the contention resolution fails, adding 1 to a beam preamble retransmission counter configured based on the third beam, or respectively adding 1 to the beam preamble retransmission counter configured based on the third beam and a beam preamble retransmission counter configured based on the fourth beam.

Further, when a count value of the beam preamble retransmission counter reaches a second preset maximum number of times of transmission Max2 or Max2+1, the method further includes:

when next retransmission of the random access preamble is performed in this random access procedure, switching beams;

when the next retransmission of the random access preamble is performed in this random access procedure, removing a beam, which is used to perform previous transmission of the random access preamble from candidate beams for next retransmission of the random access preamble; or notifying an upper layer of a random access problem or failure of the random access procedure via the MAC layer.

Further, when count values of a first preset number of beam preamble retransmission counters reach a third preset maximum number of times of transmission Max3 or Max3+ 1, an upper layer is notified of a random access problem or failure of the random access procedure via the MAC layer; or when a sum of count values of a second preset number of beam preamble retransmission counters reach the third preset maximum number of times of transmission Max3 or Max3+1, the upper layer is notified of the random access problem or the failure of the random access procedure via the MAC layer.

The specific configuration situation of the power ramping counter includes:

when any of not correctly receiving the RAR message, contention resolution failure and retransmission of the preamble occurs in the preset time and two adjacent transmissions of the preamble use the same beam, adding 1 to the power ramping counter; or when any of not correctly receiving the RAR message, contention resolution failure and retransmission of the preamble occurs in the preset time, two adjacent transmissions of the preamble use the same beam and the power ramping suspension instruction which is used to instruct the MAC layer by the physical layer is not received, adding 1 to the power ramping counter.

Further, when the power ramping counter is configured based on a single beam and the beams are switched at each re-transmission, the value of the power ramping counter corresponding to the current beam is reset to that of the power ramping counter corresponding to a transmission beam, which is used to perform the previous transmission of the random access preamble.

Therefore, in this situation, when the terminal has the power ramping counter and when the ramping power is determined, following modes are preferred:

obtaining a transmission power of retransmission after ramping according to a formula PREAMBLE_ RECEIVED_TARGET_POWER=preambleInitialReceivedTargetPowe r+DELTA_PREAMBLE+(POWER_RAMPING_COUNTER−1)*powerRampingStep;

where PREAMBLE_RECEIVED_TARGET_POWER denotes a target power value, preambleInitialReceivedTargetPower denotes an original power value, DELTA_PREAMBLE denotes a preset fixed value, POWER_RAMPING_ COUNTER denotes a value of the current power ramping counter and powerRampingStep denotes a power ramping step size;

the power ramping step size is configured by the base station for the terminal or determined by a preset rule.

In this mode, when an obtained transmission power is larger than or equals the maximum power, the method further includes:

transmitting, by the terminal, the random access preamble according to the maximum power.

4. A Preamble Transmission Counter, a Beam Preamble Retransmission Counter and a Power Ramping Counter are Configured in the Terminal It should be noted that when the preamble transmission counter, the beam preamble retransmission counter and the power ramping counter are initialized or reset in each random access procedure, the preamble transmission counter, the beam preamble retransmission counter and the power ramping counter are reset to 1 or 0.

The specific configuration situation of the preamble transmission counter includes:

when no RAR message is received by the preamble transmission counter in preset time or the contention resolution fails, adding 1 to the preamble transmission counter.

Further, when a count value of the preamble transmission counter reaches a first preset maximum number of times of transmission Max1 or Max1+1, the method further includes: notifying an upper layer of a random access problem or failure of the random access procedure via the MAC layer.

Optionally, the power ramping of the retransmission of the random access preamble is configured using following modes:

when the preamble transmission counter counts preamble retransmission, when two adjacent transmissions of the preamble use a same beam, adding one step size to a transmission power; or when the two adjacent transmissions of the preamble use the same beam and the power ramping suspension instruction which is used to instruct the MAC layer by the physical layer is not received, adding one step size to the transmission power;

otherwise, keeping the transmission power unchanged.

The step size is configured by the base station for the terminal or determined according to a preset rule.

In this situation, the configuration situation of the beam preamble re-transmission counter includes:

when the random access preamble is transmitted on a first beam and the RAR message is not correctly received in preset time, adding one to a beam preamble retransmission counter configured based on the first beam;

when a random access message three is transmitted on a second beam and the contention resolution fails, adding one to a beam preamble retransmission counter configured based on the second beam; or, when the preamble is transmitted on the third beam, the random access message three is transmitted on a fourth beam and the contention resolution fails, adding one to a beam preamble retransmission counter configured based on the third beam, or respectively adding one to the beam preamble retransmission counter configured based on the third beam and a beam preamble retransmission counter configured based on the fourth beam.

Further, when a count value of the beam preamble retransmission counter reaches a second preset maximum number of times of transmission Max2 or Max2+1, the method further includes:

when next retransmission of the random access preamble is performed in this random access procedure, switching beams;

when the next retransmission of the random access preamble is performed in this random access procedure, removing a beam, which is used to perform previous transmission of the random access preamble from candidate beams for next retransmission of the random access preamble; or notifying an upper layer of a random access problem or failure of the random access procedure via the MAC layer.

Further, when count values of a first preset number of beam preamble retransmission counters reach a third preset maximum number of times of transmission Max3 or Max3+1, an upper layer is notified of a random access problem or failure of the random access procedure via the MAC layer; or when a sum of count values of a second preset number of beam preamble retransmission counters reaches a third preset maximum number of times of transmission Max3 or Max3+1, the upper layer is notified of the random access problem or the failure of the random access procedure via the MAC layer.

In this situation, the configuration situation of the power ramping counter includes:

when any of not correctly receiving the RAR message in the preset time, contention resolution failure and retransmission of the preamble occurs and two adjacent transmissions of the preamble use the same beam, adding one to the power ramping counter; or when any of not correctly receiving the RAR message in the preset time, contention resolution failure and retransmission of the preamble occurs, two adjacent transmissions of the preamble use the same beam and the power ramping suspension instruction which is used to instruct the MAC layer by the physical layer is not received, adding one to the power ramping counter.

Further, when the power ramping counter is configured based on a single beam and when the beams are switched at each re-transmission, the value of the power ramping counter corresponding to the current beam is reset to that of the power ramping counter corresponding to a transmission beam, which is used to perform the previous transmission of the random access preamble.

Therefore, in this situation, when the terminal has the power ramping counter and when the ramping power is determined, following modes are preferred:

obtaining a transmission power of retransmission after ramping according to a formula PREAMBLE_RECEIVED_TARGET_POWER=preambleInitialReceivedTargetPowe r+DELTA_PREAMBLE+(POWER_RAMPING_COUNTER−1)*powerRampingStep;

where PREAMBLE_RECEIVED_TARGET_POWER denotes a target power value, preambleInitialReceivedTargetPower denotes an original power value, DELTA_PREAMBLE denotes a preset fixed value, POWER_RAMPING_ COUNTER denotes a value of the current power ramping counter and powerRampingStep denotes a power ramping step size;

the power ramping step size is configured by the base station for the terminal or determined by a preset rule.

In this mode, when the transmission power is larger than or equals the maximum power, the method further includes:

transmitting, by the terminal, the random access preamble according to the maximum power.

As for the above implementation situations, each implementation situation may further include: a preamble retransmission beam switching counter or a power level preamble transmission counter.

Specifically, the usage mode and count rule of the preamble retransmission beam switching counter or power level preamble transmission counter have been described above, and will not be repeated here.

It should be noted that when the above counters are used in combination, each counter can realize its own independent functions, and when there is a power ramping counter in the terminal and the ramping power is determined, the mode for obtaining the ramping power according to the power ramping counter is preferred, that is, the transmission power of the retransmission after ramping is obtained via a formula: PREAMBLE_RECEIVED_TARGET_POWER= preambleInitialReceivedTargetPowe r+DELTA_PREAMBLE+(POWER_RAMPING_COUNTER−1)*powerRampingStep.

In embodiments of the present disclosure, in the random access procedure, when detecting that the RAR message is not correctly received or contention resolution fails, the number of times of retransmission of the preamble and/or the number of times of power ramping of the transmission of the preamble are counted according to a configured counter/counters. Therefore, the problem of being unable to simultaneously satisfy the functions of counting the power ramping and preamble transmission when a single counter is used for counting both the power ramping and preamble transmission, can be avoided. With the mode in the embodiments of the present disclosure, the reliability of communication of the NR system can be guaranteed.

Figure 2:
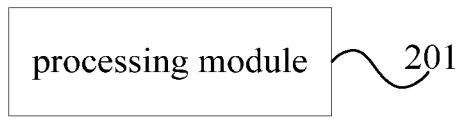
FIG. 2 is a diagram illustrating modules of a terminal according to various embodiments of the present disclosure.

As shown in FIG. 2, the terminal in embodiments of the present disclosure includes:

a processing module configured to, in a random access procedure, when detecting that no Random Access Response (RAR) is received or contention resolution fails, count a number of times of preamble retransmission and/or a number of times of power ramping of preamble transmission according to a configured counter/counters.

Optionally, the configured counter/counters includes: one type of counter;

when the RAR message is not correctly received or the contention resolution fails, the counter adds 1; or when the RAR message is not correctly received or the contention resolution fails and a power ramping suspension instruction which is used to instruct a Medium Access Control (MAC) layer by a physical layer is not received, the counter adds 1.

Specifically, the counter/counters includes: a preamble transmission counter.

Specifically, when a count value of the preamble transmission counter reaches a first preset maximum number of times of transmission Max1 or Max1+1, an upper layer is notified of a random access problem or failure of the random access procedure via the MAC layer.

Specifically, when the preamble transmission counter counts preamble retransmission, when two adjacent transmissions of the preamble use a same beam, the transmission power adds one step size; or when the two adjacent transmissions of the preamble use the same beam and the power ramping suspension instruction which is used to instruct the MAC layer by the physical layer is not received, the transmission power adds one step size;

otherwise, the transmission power is kept unchanged.

The step size is configured by the base station for the terminal or determined according to a preset rule.

Further, when an obtained transmission power is larger than or equals the maximum transmission power, the processing module is configured to:

transmit the random access preamble according to the maximum power.

Specifically, the counter includes: a beam preamble retransmission counter.

Specifically, when the preamble is transmitted on a first beam and the RAR message is not correctly received in preset time, a beam preamble retransmission counter configured based on the first beam adds 1;

when a random access message three is transmitted on a second beam and the contention resolution fails, a beam preamble retransmission counter configured based on the second beam adds 1; or when the preamble is transmitted on the third beam, the random access message three is transmitted on a fourth beam and the contention resolution fails, a beam preamble retransmission counter configured based on the third beam adds 1, or the beam preamble retransmission counter configured based on the third beam and a beam preamble retransmission counter configured based on the fourth beam respectively add 1.

Specifically, when a count value of the beam preamble retransmission counter reaches a second preset maximum number of times of transmission Max2 or Max2+1, the processing module is configured to:

when next retransmission of the random access preamble is performed in this random access procedure, switch beams;

when the next retransmission of the random access preamble is performed in this random access procedure, remove a beam, which is used to perform previous transmission of the random access preamble from candidate beams for the next retransmission of the random access preamble; or notify an upper layer of a random access problem or failure of the random access procedure via the MAC layer.

Specifically, when the next retransmission of the random access preamble is performed in this random access procedure, the implementation mode of removing the beam, which is used to perform the previous transmission of the random access preamble from the candidate beams for the next retransmission of the random access preamble, includes:

in preset time or a preset number of times, removing the beam, which is used to perform the previous transmission of the random access preamble from the candidate beams for the next retransmission of the random access preamble.

Specifically, when reaching the preset time or preset number of times, the beam preamble retransmission counter is restarted.

Specifically, when the next retransmission of the random access preamble is performed in this random access procedure, the implementation mode of removing the beam, which is used to perform the previous transmission of the random access preamble from the candidate beams for the next retransmission of the random access preamble, includes:

when transmission powers of the terminal are in a same power level or preset number of power levels, removing the beam, which is used to perform the previous transmission of the random access preamble from the candidate beams for the next retransmission of the random access preamble.

Specifically, when the transmission powers of the terminal exceed the same power level or the preset number of power levels, the beam preamble retransmission counter is restarted.

Specifically, when count values of a first preset number of beam preamble retransmission counters reach a third preset maximum number of times of transmission Max3 or Max3+1, an upper layer is notified of a random access problem or failure of the random access procedure via the MAC layer.

Specifically, when a sum of count values of a second preset number of beam preamble retransmission counters reaches a third preset maximum number of times of transmission Max3 or Max3+1, an upper layer is notified of a random access problem or failure of the random access procedure via the MAC layer.

Specifically, the method for counting preamble retransmission in the random access procedure further includes:

when two adjacent transmissions of the preamble use a same beam, adding one step size to a transmission power; or when the two adjacent transmissions of the preamble use the same beam and the power ramping suspension instruction which is used to instruct the MAC layer by the physical layer is not received, adding one step size to the transmission power;

otherwise, keeping the transmission power unchanged.

The step size is configured by the base station for the terminal or determined according to a preset rule.

Specifically, when an obtained transmission power is larger than or equals the maximum transmission power, the processing module is configured to:

transmit the random access preamble according to the maximum power.

Specifically, the counter/counters includes a power ramping counter.

Specifically, when any of not correctly receiving the RAR message in preset time, contention resolution failure and retransmission of the preamble occurs and two adjacent transmissions of the preamble use a same beam, the power ramping counter adds 1; or when any of not correctly receiving the RAR message in the preset time, contention resolution failure and retransmission of the preamble occurs, two adjacent transmissions of the preamble use the same beam and the power ramping suspension instruction which is used to instruct the MAC layer by the physical layer is not received, the power ramping counter adds 1.

Specifically, when the power ramping counter is configured based on a single beam and the beams are switched at each retransmission, the value of the power ramping counter corresponding to the current beam is reset to that of the power ramping counter corresponding to a transmission beam, which is used to perform the previous transmission of the random access preamble.

Specifically, the transmission power of retransmission after ramping is obtained according to a formula PREAMBLE_RECEIVED_TARGET_POWER=preambleInitialReceivedTargetPower+DELTA_PREAMBLE+(POWER_RAMPING_COUNTER−1)*powerRampingStep;

where PREAMBLE_RECEIVED_TARGET_POWER denotes a target power value, preambleInitialReceivedTargetPower denotes an original power value, DELTA_PREAMBLE denotes a preset fixed value, POWER_RAMPING_ COUNTER denotes a value of the current power ramping counter and powerRampingStep denotes a power ramping step size;

the power ramping step size is configured by the base station for the terminal or determined by a preset rule.

Further, when a transmission power obtained via calculation is larger than or equals the maximum power, the processing module is further configured to:

transmit the random access preamble according to the maximum power.

Specifically, the method for counting preamble retransmission in the random access procedure further includes:

when a count value of the power ramping counter reaches a maximum number of times or the maximum number of times plus 1 and when not correctly receiving the RAR messages or contention resolution failure occurs for a preset number of times in the present time, an upper layer is notified of a random access problem or failure of the random access procedure via the MAC layer.

Specifically, the counter/counters includes: a preamble retransmission beam switching counter or a power level preamble transmission counter.

Specifically, when beams are switched when the preamble is re-transmitted, the preamble retransmission beam switching counter or power level preamble transmission counter adds 1.

Specifically, when the preamble retransmission beam switching counter or power level preamble transmission counter reaches a preset maximum number of times Max4 or Max4+1, the processing module is configured to:

perform power ramping when re-transmitting the random access preamble and reset the preamble retransmission beam switching counter or power level preamble transmission counter;

at next retransmission of the random access preamble, keeping beams un-switched; or at the next retransmission of the random access preamble, switch to a beam, which has not been used to transmit the random access preamble, to re-transmit the random access preamble.

Specifically, an implementation mode of switching to the beam, which has not been used to transmit the random access preamble, to re-transmit the random access preamble includes:

switching to a beam that is in a same power level or preset number of power levels with the current beam and has not been used to transmit the random access preamble, to re-transmit the random access preamble.

Specifically, when a transmission power used by the terminal for transmitting the preamble changes, the preamble retransmission beam switching counter or power level preamble transmission counter is reset.

Specifically, when the preamble retransmission beam switching counter or power level preamble transmission counter reaches the maximum count value and a current transmission power of a terminal reaches the maximum transmission power, the upper layer is notified of a random access problem or failure of the random access procedure via the MAC layer.

Optionally, the configured counters include: at least two types of counters;

when the counters reach the maximum count value, the upper layer is notified of a random access problem or failure of the random access procedure via the MAC layer.

Specifically, the at least two types of counters include: a preamble transmission counter and a beam preamble retransmission counter.

Specifically, when the preamble is transmitted on a first beam and no RAR message is received in preset time, a beam preamble retransmission counter configured based on the first beam adds 1;

when a random access message three is transmitted on a second beam and the contention resolution fails, a beam preamble retransmission counter configured based on the second beam adds 1; or when the preamble is transmitted on a third beam, a random access message three is transmitted on a fourth beam and the contention resolution fails, a beam preamble retransmission counter configured based on the third beam adds 1, or the beam preamble retransmission counter configured based on the third beam and a beam preamble retransmission counter configured based on the fourth beam respectively add 1.

Specifically, when a count value of the beam preamble retransmission counter reaches a second preset maximum number of times of transmission Max2 or Max2+1, the processing module is further configured to:

when next retransmission of the random access preamble is performed in this random access procedure, switch beams;

when the next retransmission of the random access preamble is performed in this random access procedure, remove a beam, which is used to perform previous transmission of the random access preamble from candidate beams for the next retransmission of the random access preamble; or notify an upper layer of a random access problem or failure of the random access procedure via the MAC layer.

Specifically, when two adjacent transmissions of the preamble use a same beam, a transmission power adds one step size; or when the two adjacent transmissions of the preamble use the same beam and the power ramping suspension instruction which is used to instruct the MAC layer by the physical layer is not received, the transmission power adds one step size;

otherwise, the transmission power is kept unchanged;

where the step size is configured by the base station for the terminal or determined according to a preset rule.

Specifically, when an obtained transmission power is larger than or equals the maximum transmission power, the processing module is further configured to:

transmit the random access preamble according to the maximum power.

Specifically, the method for counting preamble retransmission in the random access procedure further includes:

when a count value of the preamble transmission counter reaches a first preset maximum number of times of transmission Max1 or Max1+1, notifying an upper layer of a random access problem or failure of the random access procedure via the MAC layer;

when count values of a first preset number of beam preamble retransmission counters reach a third preset maximum number of times of transmission Max3 or Max3+1, notifying the upper layer of the random access problem or the failure of the random access procedure via the MAC layer; or when a sum of count values of a second preset number of beam preamble retransmission counters reaches the third preset maximum number of times of transmission Max3 or Max3+1, notifying the upper layer of the random access problem or the failure of the random access procedure via the MAC layer.

Specifically, the at least two types of counters include: a preamble transmission counter and a power ramping counter.

Specifically, when the RAR message is not correctly received by the preamble transmission counter in preset time or the contention resolution fails, the preamble transmission counter adds 1.

Specifically, when a count value of the preamble transmission counter reaches a first preset maximum number of times of transmission Max1 or Max1+1, the upper layer is notified of a random access problem or failure of the random access procedure via the MAC layer.

Specifically, when the preamble transmission counter counts preamble retransmission, when and two adjacent transmissions of the preamble use a same beam, a transmission power adds one step size; or when the two adjacent transmissions of the preamble use the same beam and the power ramping suspension instruction which is used to instruct the MAC layer by the physical layer is not received, the transmission power adds one step size;

otherwise, the transmission power is kept unchanged;

where the step size is configured by the base station for the terminal or determined according to a preset rule.

Specifically, when any of not correctly receiving the RAR message in preset time, contention resolution failure and retransmission of the preamble occurs and two adjacent transmissions of the preamble use a same beam, the power ramping counter adds 1; or when any of not correctly receiving the RAR message in the preset time, contention resolution failure and retransmission of the preamble occurs, two adjacent transmissions of the preamble use the same beam and the power ramping suspension instruction which is used to instruct the MAC layer by the physical layer is not received, the power ramping counter adds 1.

Specifically, when the power ramping counter is configured based on a single beam and the beams are switched at each retransmission, the value of the power ramping counter corresponding to the current beam is reset to that of the power ramping counter corresponding to a transmission beam, which is used to perform the previous transmission of the random access preamble.

Specifically, the transmission power of retransmission after ramping is obtained according to a formula PREAMBLE_RECEIVED_TARGET_POWER=preambleInitialReceivedTargetPower+DELTA_PREAMBLE+(POWER_RAMPING_COUNTER−1)*powerRampingStep;

where PREAMBLE_RECEIVED_TARGET_POWER denotes a target power value, preambleInitialReceivedTargetPower denotes an original power value, DELTA_PREAMBLE denotes a preset fixed value, POWER_RAMPING_ COUNTER denotes a value of the current power ramping counter and powerRampingStep denotes a power ramping step size;

the power ramping step size is configured by the base station for the terminal or determined by a preset rule.

Specifically, when a transmission power obtained via calculation is larger than or equals the maximum power, the processing module is further configured to transmit the random access preamble according to the maximum power.

Specifically, the at least two types of counters include: a beam preamble retransmission counter and a power ramping counter.

Specifically, the transmission power of retransmission after ramping is obtained according to a formula PREAMBLE_RECEIVED_TARGET_POWER=preambleInitialReceivedTargetPower+DELTA_PREAMBLE+(POWER_RAMPING_COUNTER−1)*powerRampingStep;

where PREAMBLE_RECEIVED_TARGET_POWER denotes a target power value, preambleInitialReceivedTargetPower denotes an original power value, DELTA_PREAMBLE denotes a preset fixed value, POWER_RAMPING_COUNTER denotes a value of the current power ramping counter and powerRampingStep denotes a power ramping step size;

the power ramping step size is configured by the base station for the terminal or determined by a preset rule.

Specifically, when any of not correctly receiving the RAR message in the preset time, contention resolution failure and retransmission of the preamble occurs and two adjacent transmissions of the preamble use the same beam, the power ramping counter adds 1; or when any of not correctly receiving the RAR message in the preset time, contention resolution failure and retransmission of the preamble occurs, two adjacent transmissions of the preamble use the same beam and the power ramping suspension instruction which is used to instruct the MAC layer by the physical layer is not received, the power ramping counter adds 1.

Specifically, when the power ramping counter is configured based on a single beam and the beams are switched at each retransmission, the value of the power ramping counter corresponding to the current beam is reset to that of the power ramping counter corresponding to a transmission beam, which is used to perform the previous transmission of the random access preamble.

Specifically, when the preamble is transmitted on a first beam and the RAR message is not received in preset time, a beam preamble retransmission counter configured based on the first beam adds 1;

when a random access message three is transmitted on a second beam and the contention resolution fails, a beam preamble retransmission counter configured based on the second beam adds 1; or when the preamble is transmitted on the third beam, the random access message three is transmitted on a fourth beam and the contention resolution fails, a beam preamble retransmission counter configured based on the third beam adds 1, or the beam preamble retransmission counter configured based on the third beam and a beam preamble retransmission counter configured based on the fourth beam respectively adds 1.

Specifically, when a count value of the beam preamble retransmission counter reaches a second preset maximum number of times of transmission Max2 or Max2+1, the processing module is further configured to:

when next retransmission of the random access preamble is performed in this random access procedure, switch beams;

when the next retransmission of the random access preamble is performed in this random access procedure, remove a beam, which is used to perform previous transmission of the random access preamble from candidate beams for next retransmission of the random access preamble; or notify an upper layer of a random access problem or failure of the random access procedure via the MAC layer.

Specifically, when count values of a first preset number of beam preamble retransmission counters reach a third preset maximum number of times of transmission Max3 or Max3+1, an upper layer is notified of a random access problem or failure of the random access procedure via the MAC layer; or when a sum of count values of a second preset number of beam preamble retransmission counters reach a third preset maximum number of times of transmission Max3 or Max3+1, the upper layer is notified of the random access problem or the failure of the random access procedure via the MAC layer.

Specifically, the at least two types of counters include: a preamble transmission counter, a beam preamble retransmission counter and a power ramping counter.

Specifically, when the RAR message is not correctly received in preset time or the contention resolution fails, the preamble transmission counter adds 1.

Specifically, when a count value of the preamble transmission counter reaches a first preset maximum number of times of transmission Max 1 or Max1+1, an upper layer is notified of a random access problem or failure of the random access procedure via the MAC layer.

Specifically, when the preamble transmission counter counts preamble retransmission, when two adjacent transmissions of the preamble use a same beam, a transmission power adds one step size; or when the two adjacent transmissions of the preamble use the same beam and the power ramping suspension instruction which is used to instruct the MAC layer by the physical layer is not received, the transmission power adds one step size;

otherwise, the transmission power is kept unchanged;

where the step size is configured by the base station for the terminal or determined according to a preset rule.

Specifically, when the preamble is transmitted on a first beam and the RAR message is not correctly received in preset time, a beam preamble retransmission counter configured based on the first beam adds 1;

when a random access message three is transmitted on a second beam and the contention resolution fails, a beam preamble retransmission counter configured based on the second beam adds 1; or when the preamble is transmitted on a third beam, the random access message three is transmitted on a fourth beam and the contention resolution fails, a beam preamble retransmission counter configured based on the third beam adds 1, or the beam preamble retransmission counter configured based on the third beam and a beam preamble re-transmission counter configured based on the fourth beam respectively add 1.

Specifically, when a count value of the beam preamble retransmission counter reaches s second preset maximum number of times of transmission Max2 or Max2+1, the processing module is further configured to:

when next retransmission of the random access preamble is performed in this random access procedure, switch beams;

when the next retransmission of the random access preamble is performed in this random access procedure, remove a beam, which is used to perform previous transmission of the random access preamble from candidate beams for next retransmission of the random access preamble; or notify an upper layer of a random access problem or failure of the random access procedure via the MAC layer.

Specifically, when count values of a first preset number of beam preamble retransmission counters reach a third preset maximum number of times of transmission Max3 or Max3+1, the upper layer is notified of the random access problem or failure of the random access procedure via the MAC layer; or when a sum of count values of a second preset number of beam preamble retransmission counters reaches a third preset maximum number of times of transmission Max3 or Max3+1, the upper layer is notified of the random access problem or the failure of the random access procedure via the MAC layer.

Specifically, when any of not correctly receiving the RAR message in the preset time, contention resolution failure and retransmission of the preamble occurs and two adjacent transmissions of the preamble use the same beam, the power ramping counter adds 1; or when any of not correctly receiving the RAR message in the preset time, contention resolution failure and retransmission of the preamble occurs, two adjacent transmissions of the preamble use the same beam and the power ramping suspension instruction which is used to instruct the MAC layer by the physical layer is not received, the power ramping counter adds 1.

Specifically, when the power ramping counter is configured based on a single beam and the beams are switched at each retransmission, the value of the power ramping counter corresponding to the current beam is reset to that of the power ramping counter corresponding to a transmission beam, which is used to perform the previous transmission of the random access preamble.

Specifically, the transmission power of retransmission after ramping is obtained according to a formula PREAMBLE_RECEIVED_TARGET_POWER=preambleInitialReceivedTargetPower+DELTA_PREAMBLE+(POWER_RAMPING_COUNTER−1)*powerRampingStep;

where PREAMBLE_RECEIVED_TARGET_POWER denotes a target power value, preambleInitialReceivedTargetPower denotes an original power value, DELTA_PRE- AMBLE denotes a preset fixed value, POWER_RAMPING_ COUNTER denotes a value of the current power ramping counter and powerRampingStep denotes a power ramping step size;

the power ramping step size is configured by the base station for the terminal or determined by a preset rule.

Further, when the transmission power is larger than or equals the maximum power, the processing module is further configured to:

transmit the random access preamble according to the maximum power.

Specifically, the at least two types of counters include: a preamble retransmission beam switching counter or a power level preamble transmission counter.

Specifically, when beams are switched when the preamble is re-transmitted, the preamble retransmission beam switching counter or power level preamble transmission counter adds 1.

Specifically, when the preamble retransmission beam switching counter or power level preamble transmission counter reaches a preset maximum number of times Max4 or Max4+1, the processing module is further configured to:

perform power ramping when re-transmitting the random access preamble and reset the preamble retransmission beam switching counter or power level preamble transmission counter;

at next retransmission of the random access preamble, keep beams un-switched; or at the next retransmission of the random access preamble, switch to a beam, which has not been used to transmit the random access preamble, to re-transmit the random access preamble.

Specifically, an implementation mode of switching to the beam, which has not been used to transmit the random access preamble, to re-transmit the random access preamble, includes:

switching to a beam that is in a same power level or preset number of power levels with the current beam and has not been used to transmit the random access preamble, to re-transmit the random access preamble.

Specifically, when the preamble retransmission beam switching counter or power level preamble transmission counter reaches the maximum count value and a current transmission power of a terminal reaches the maximum transmission power, the upper layer is notified of the random access problem or failure of the random access procedure via the MAC layer.

Specifically, when a transmission power used by the terminal for transmitting the preamble changes, the preamble retransmission beam switching counter or power level preamble transmission counter is reset.

It should be noted that the terminal embodiment is that corresponding to the method for counting preamble retransmission in the random access procedure applied to the terminal side. All implementation modes in the above embodiments are applicable to this terminal embodiment and technical effects of all implementation modes in this terminal embodiment are the same as those of the implementation modes in the above embodiments.

Embodiments of the present disclosure further provide a terminal, including: a storage, a processor and computer programs, which are stored in the storage and run on the processor. When the computer programs are executed by the processor, each process in the method embodiment for counting preamble retransmission in a random access procedure at the terminal side is implemented and the same technical effects may be achieved. In order to avoid repetition, the method is not repeated here.

Embodiments of the present disclosure further provide a computer readable storage medium, storing computer programs. When the computer programs are executed by a processor, each process in the method embodiment for counting preamble retransmission in a random access procedure at the terminal side is implemented and the same technical effects may be achieved. In order to avoid repetition, the method is not repeated here. The aforesaid computer readable storage medium includes a read-only Memory (ROM), Random Access Memory (RAM), a disk or disc, etc.

Figure 3:
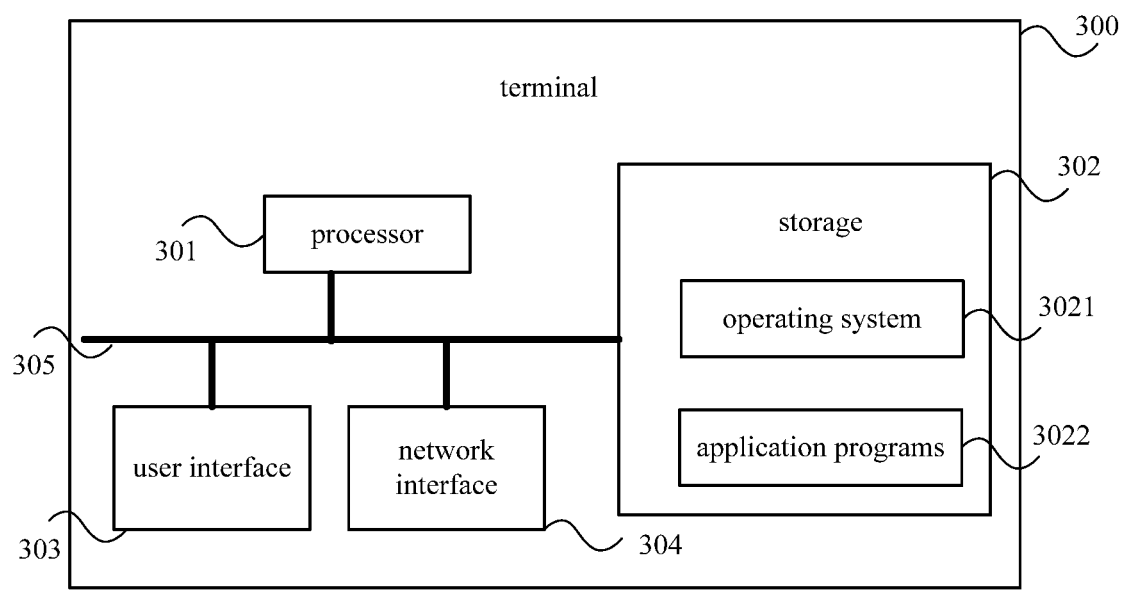
FIG. 3 is a diagram illustrating structure of a terminal according to various embodiments of the present disclosure.

As shown in FIG. 3, FIG. 3 is a diagram illustrating structure of a terminal of an embodiment of the present disclosure. The application entity of the method for counting preamble retransmission in a random access procedure of the present disclosure is described hereinafter in detail accompanying with the figure.

The terminal 300 shown in FIG. 3 includes: at least one first processor 301, a storage 302, at least one network interface 304 and a user interface 303. Each component in the terminal 300 is coupled together via bus system 305. It can be understood that the bus system 305 is used to implement connected communication among these components. Besides a data bus, the bus system 305 further includes: a power bus, control bus and a state signal bus. For clear description, various buse in FIG. 3 are denoted as the bus system 305.

The user interface 303 may include a monitor, keyboard, or clickable device (for example, a mouse, track ball, touchpad, or touch screen).

It can be understood that the storage 302 in embodiments of the present disclosure can be a volatile storage or a nonvolatile storage, or both the volatile storage and nonvolatile storage. The nonvolatile storage can be Read Only Memory (ROM), Programmable Read-Only Memory (PROM), Erasable Programmable Read-Only Memory (EPROM), Electrically Erasable Programmable Read-Only Memory (EEPROM) or flash. The volatile storage can be Random Access Memory (RAM), which is used as an external cache. As an illustrative but not restrictive specification, many forms of RAMs are available, such as Static RAM (SRAM), Dynamic RAM (DRAM), Synchronous DRAM (SDRAM), Double Data Rate SDRAM (DDRSDRAM), Enhanced SDRAM (ESDRAM), Synchronization Link DRAM (SLDRAM) and Direct Rambus RAM (DRRAM). The storage 302 in the system and method described in embodiments of the present disclosure include, but is not limited to, these and any other suitable types of storages.

In some embodiments, the storage 302 stores following elements, such as executable modules, data structure, subset thereof, or superset thereof: operating system (OS) 3021 and application programs 3022.

The OS 3021 includes various kinds of system programs, such as a framework layer, a core library layer and a driver layer, which are used to implement various kinds of basic services and process hardware-based tasks. The application programs 3022 include various kinds of application programs, such as Media Player and Browser, which are used to implement various kinds of application services. Programs, which are used to implement the methods in embodiments of the present disclosure, may be included in the application programs 3022.

In an embodiment of the present disclosure, the terminal 300 further includes: the computer programs, which are stored in the storage 302 and may run on the processor 301.

Specifically, the computer programs may be computer control programs in the application programs 3022. When the computer programs are executed by the processor 301, following steps are implemented: in a random access procedure, when detecting that no Random Access Response (RAR) is received or contention resolution fails, counting a number of times of retransmission of the preamble and/or a number of times of power ramping of the transmission of the preamble according to a configured counter/counters.

The methods in the above embodiments of the present disclosure may be applied to or implemented by the processor 301. The processor 301 may be an integrated circuit chip with signal processing power. In the implementation process, each step of the above method can be completed by the integrated logic circuit of the hardware in processor 301 or the instructions in the form of software. The processor 301 mentioned above may be a general purpose Processor, Digital Signal Processor (DSP), Application Specific Integrated Circuit (ASIC), Field Programmable Gate Array (FPGA) or other Programmable logic device, discrete Gate or transistor logic device, discrete hardware component. Methods, steps and logical block diagrams disclosed in this public embodiment may be realized or implemented. A general-purpose processor can be a microprocessor or the general-purpose processor can be any regular processor, etc. The steps in combination with the method disclosed in this public embodiment may be directly embodied as the execution of the hardware decoding processor or by a combination of hardware and software modules in the decoding processor. Software modules can be located in random access memory, flash memory, read only memory, programmable read only memory or electrically-erasable programmable memory, register and other mature computer readable storage media in this field. The readable storage medium of the computer is located in storage 302, and the processor 301 reads the information in the storage 302 to implement steps in the above method in combination with the hardware. Specifically, the computer programs are stored on the computer readable storage medium. When the computer programs are executed by the processor 301, following steps are executed.

It can be understood that these embodiments described in the present disclosure may be implemented with hardware, software, firmware, middleware, microcode, or a combination thereof. As for hardware implementation, the processing unit can be implemented in one or multiple Application-Specific Integrated Circuits (ASIC), Digital Signal Processors (DSP), Digital Signal Processing Devices (DSPD), Programmable Logic Devices (PLD), Field-Programmable Gate Arrays (FPGA), general-purpose processors, controllers, micro-controllers, micro-processors, and other electronic units or combinations thereof used to perform the functions described in this the present disclosure.

For software implementations, the technologies described in the present disclosure can be implemented through the modules that perform the functions described in the present disclosure (such as procedures, functions, and so on). Software codes can be stored in the storage and executed by the processor. The storage can be implemented in or outside of the processor.

Optionally, the configured counter includes one type of counter and when the computer programs are executed by the processor 301, following processing is implemented: when the RAR message is not correctly received or the contention resolution fails, adding 1 to the counter; or when the RAR message is not correctly received or the contention resolution fails and a power ramping suspension instruction which is used to instruct a Medium Access Control (MAC) layer by a physical layer is not received, adding 1 to the counter.

Optionally, the counter includes: a preamble transmission counter, and when the computer programs are executed by the processor 301, following processing is implemented: when a count value of the preamble transmission counter reaches a first preset maximum number of times of transmission Max1 or Max1+1, notifying an upper layer of a random access problem or failure of the random access procedure via the MAC layer.

Optionally, when the computer programs are executed by the processor 301, following processing is implemented: when the preamble transmission counter counts preamble re-transmission times, when two adjacent transmissions of the preamble use a same beam, adding one step size to a transmission power; or when the two adjacent transmissions of the preamble use the same beam and the power ramping suspension instruction which is used to instruct the MAC layer by the physical layer is not received, adding one step size to the transmission power;

otherwise, keeping the transmission power unchanged;

where the step size is configured by the base station for the terminal or determined according to a preset rule.

Optionally, when an obtained transmission power is larger than or equals the maximum transmission power and the computer programs are executed by the processor 301, following processing is implemented:

transmitting the random access preamble according to the maximum transmission power.

Optionally, the counter includes: a beam preamble retransmission counter. When the computer programs are executed by the processor 301, following processing is implemented: when the random access preamble is transmitted on a first beam and the RAR message is not received in preset time, adding 1 to a beam preamble retransmission counter configured based on the first beam;

when a random access message three is transmitted on a second beam and the contention resolution fails, adding 1 to a beam preamble retransmission counter configured based on the second beam; or when the random access preamble is transmitted on the third beam, the random access message three is transmitted on a fourth beam and the contention resolution fails, adding 1 to a beam preamble retransmission counter configured based on the third beam, or respectively adding 1 to the beam preamble retransmission counter configured based on the third beam and a beam preamble retransmission counter configured based on the fourth beam.

Optionally, when a count value of the beam preamble retransmission counter reaches a second preset maximum number of times of transmission Max2 or Max2+1 and the computer programs are executed by the processor 301, following processing is implemented:

when next retransmission of the random access preamble is performed in this random access procedure, switching beams;

when the next retransmission of the random access preamble is performed in this random access procedure, removing a beam, which is used to perform previous transmission of the random access preamble from candidate beams for next retransmission of the random access preamble; or notifying an upper layer of a random access problem or failure of the random access procedure via the MAC layer.

Optionally, when the computer programs are executed by the processor 301, following processing is implemented:

when the next retransmission of the random access preamble is performed in this random access procedure, the implementation mode of removing the beam, which is used to perform the previous transmission of the random access preamble from the candidate beams for the next retransmission of the random access preamble includes:

in preset time or preset number of times, removing the beam, which is used to perform the previous transmission of the random access preamble from the candidate beams for the next retransmission of the random access preamble.

Optionally, when the computer programs are executed by the processor 301, following processing is implemented: when reaching the preset time or preset number of times, restarting the beam preamble retransmission counter.

Optionally, when the computer programs are executed by the processor 301, following processing is implemented: when the next retransmission of the random access preamble is performed in this random access procedure, the implementation mode for removing the beam, which is used to perform the previous transmission of the random access preamble from the candidate beams for the next retransmission of the random access preamble includes:

when transmission powers of the terminal are in a same power level or preset number of power levels, removing the beam, which is used to perform the previous transmission of the random access preamble from the candidate beams for the next retransmission of the random access preamble.

Optionally, when the computer programs are executed by the processor 301, following processing is implemented: when the transmission powers of the terminal exceed the same power level or the preset number of power levels, restarting the beam preamble re-transmission counter.

Optionally, when the computer programs are executed by the processor 301, following processing is implemented: when count values of a first preset number of beam preamble retransmission counters reach a third preset maximum number of times of transmission Max3 or Max3+1, notifying an upper layer of a random access problem or failure of the random access procedure via the MAC layer.

Optionally, when the computer programs are executed by the processor 301, following processing is implemented: when a sum of count values of a second preset number of beam preamble retransmission counters reaches a third preset maximum number of times of transmission Max3 or Max3+1, notifying an upper layer of a random access problem or failure of the random access procedure via the MAC layer.

Optionally, when the computer programs are executed by the processor 301, following processing is implemented: when two adjacent transmissions of the preamble use a same beam, adding one step size to a transmission power; or when the two adjacent transmissions of the preamble use the same beam and the power ramping suspension instruction which is used to instruct the MAC layer by the physical layer is not received, adding one step size to the transmission power;

otherwise, keeping the transmission power unchanged;

where the step size is configured by the base station for the terminal or determined according to a preset rule.

Optionally, when an obtained transmission power is larger than or equals the maximum transmission power and the computer programs are executed by the processor 301, following processing is implemented: transmitting, by the terminal, the random access preamble according to the maximum power, and/or instructing suspending power ramping.

Optionally, the counter includes a power ramping counter. When the computer programs are executed by the processor 301, following processing is implemented: when any of not correctly receiving the RAR message in preset time, contention resolution failure and retransmission of the preamble occurs and two adjacent transmissions of the preamble use a same beam, adding 1 to the power ramping counter; or when any of not correctly receiving the RAR message in the preset time, contention resolution failure and retransmission of the preamble occurs, two adjacent transmissions of the preamble use the same beam and the power ramping suspension instruction which is used to instruct the MAC layer by the physical layer is not received, adding 1 to the power ramping counter.

Optionally, when the computer programs are executed by the processor 301, following processing is implemented: when the power ramping counter is configured based on a single beam and the beams are switched at each retransmission, resetting the value of the power ramping counter corresponding to the current beam to that of the power ramping counter corresponding to a transmission beam, which is used to perform the previous transmission of the random access preamble.

Optionally, when the computer programs are executed by the processor 301, following processing is implemented: obtaining a transmission power of retransmission after ramping according to a formula PREAMBLE_RECEIVED_TARGET_POWER=preambleInitialReceivedTargetPowe r+DELTA_PREAMBLE+(POWER_RAMPING_COUNTER−1)*powerRampingStep;

where PREAMBLE_RECEIVED_TARGET_POWER denotes a target power value, preambleInitialReceivedTargetPower denotes an original power value, DELTA_PREAMBLE denotes a preset fixed value, POWER_RAMPING_ COUNTER denotes a value of the current power ramping counter and powerRampingStep denotes a power ramping step size;

the power ramping step size is configured by the base station for the terminal or determined by a preset rule.

Optionally, when a transmission power obtained via calculation is larger than or equals the maximum power and the computer programs are executed by the processor 301, following processing is implemented: transmitting the random access preamble according to the maximum power.

Optionally, when the computer programs are executed by the processor 301, following processing is implemented: when a count value of the power ramping counter reaches the maximum number of times or the maximum number of times plus 1 and when not correctly receiving the RAR messages or contention resolution failure occurs for a preset number of times in the present time, notifying an upper layer of a random access problem or failure of the random access procedure via the MAC layer.

Optionally, the counter includes: a preamble retransmission beam switching counter or a power level preamble transmission counter. When the computer programs are executed by the processor 301, following processing is implemented: when beams are switched when the preamble is re-transmitted, adding 1 to the preamble retransmission beam switching counter or power level preamble transmission counter.

Optionally, when the preamble retransmission beam switching counter or power level preamble transmission counter reaches a preset maximum number of times Max4 or Max4+1 and when the computer programs are executed by the processor 301, following processing is implemented:

performing power ramping when re-transmitting the random access preamble and resetting the preamble retransmission beam switching counter or power level preamble transmission counter;

at next retransmission of the random access preamble, keeping beams un-switched; or at the next retransmission of the random access preamble, switching to a beam, which has not been used to transmit the random access preamble, to re-transmit the random access preamble.

Optionally, when the computer programs are executed by the processor 301, following processing is implemented: an implementation mode of switching to the beam, which has not been used to transmit the random access preamble, to re-transmit the random access preamble includes:

switching to a beam that is in a same power level or preset number of power levels with the current beam and has not been used to transmit the random access preamble, to re-transmit the random access preamble.

Optionally, when the computer programs are executed by the processor 301, following processing is implemented: when a transmission power used by a terminal for transmitting the preamble changes, resetting the preamble retransmission beam switching counter or power level preamble transmission counter.

Optionally, when the computer programs are executed by the processor 301, following processing is implemented: when the preamble retransmission beam switching counter or power level preamble transmission counter reaches the maximum count value and a current transmission power of a terminal reaches the maximum transmission power, notifying an upper layer of a random access problem or failure of the random access procedure via the MAC layer.

Optionally, the configured counters include: at least two types of counters. When the computer programs are executed by the processor 301, following processing is implemented: when the counters reach the maximum counting quantities, notifying an upper layer of a random access problem or failure of the random access procedure via the MAC layer.

Optionally, the at least two types of counters include: a preamble transmission counter and a beam preamble retransmission counter. When the computer programs are executed by the processor 301, following processing is implemented: when the random access preamble is transmitted on a first beam and the RAR message is not received in preset time, adding 1 to a beam preamble retransmission counter configured based on the first beam;

when a random access message three is transmitted on a second beam and the contention resolution fails, adding 1 to a beam preamble retransmission counter configured based on the second beam; or when the random access preamble is transmitted on a third beam, a random access message three is transmitted on a fourth beam and the contention resolution fails, adding 1 to a beam preamble retransmission counter configured based on the third beam, or respectively adding 1 to the beam preamble retransmission counter configured based on the third beam and a beam preamble retransmission counter configured based on the fourth beam.

Optionally, when a count value of the beam preamble retransmission counter reaches a second preset maximum number of times of transmission Max2 or Max2+1 and when the computer programs are executed by the processor 301, following processing is implemented: when next retransmission of the random access preamble is performed in this random access procedure, switching beams;

when the next retransmission of the random access preamble is performed in this random access procedure, removing a beam, which is used to perform previous transmission of the random access preamble from candidate beams for the next retransmission of the random access preamble; or notifying an upper layer of a random access problem or failure of the random access procedure via the MAC layer.

Optionally, when the computer programs are executed by the processor 301, following processing is implemented: when two adjacent transmissions of the preamble use a same beam, adding one step size to a transmission power; or when the two adjacent transmissions of the preamble use the same beam and the power ramping suspension instruction which is used to instruct the MAC layer by the physical layer is not received, adding one step size to the transmission power;

otherwise, keeping the transmission power unchanged;

where the step size is configured by the base station for the terminal or determined according to a preset rule.

Optionally, when an obtained transmission power is larger than or equals the maximum transmission power and when the computer programs are executed by the processor 301, following processing is implemented: transmitting the random access preamble according to the maximum power.

Optionally, when the computer programs are executed by the processor 301, following processing is implemented: when a count value of the preamble transmission counter reaches a first preset maximum number of times of transmission Max1 or Max1+1, notifying an upper layer of a random access problem or failure of the random access procedure via the MAC layer;

when count values of a first preset number of beam preamble retransmission counters reach a third preset maximum number of times of transmission Max3 or Max3+1, notifying the upper layer of the random access problem or the failure of the random access procedure via the MAC layer; or when a sum of count values of a second preset number of beam preamble retransmission counters reaches a third preset maximum number of times of transmission Max3 or Max3+1, notifying the upper layer of the random access problem or the failure of the random access procedure via the MAC layer.

Optionally, the at least two types of counters include: a preamble transmission counter and a power ramping counter. When the computer programs are executed by the processor 301, following processing is implemented: when the RAR message is not correctly received in preset time or the contention resolution fails, adding 1 to the preamble transmission counter.

Optionally, when the computer programs are executed by the processor 301, following processing is implemented: when a count value of the preamble transmission counter reaches a first preset maximum number of times of transmission Max1 or Max1+1, notifying an upper layer of a random access problem or failure of the random access procedure via the MAC layer.

Optionally, when the computer programs are executed by the processor 301, following processing is implemented: when the preamble transmission counter counts preamble retransmission, when two adjacent transmissions of the preamble use a same beam, adding one step size to a transmission power; or when the two adjacent transmissions of the preamble use the same beam and the power ramping suspension instruction which is used to instruct the MAC layer by the physical layer is not received, adding one step size to the transmission power;

otherwise, keeping the transmission power unchanged;

where the step size is configured by the base station for the terminal or determined according to a preset rule.

Optionally, when the computer programs are executed by the processor 301, following processing is implemented: when any of not correctly receiving the RAR message in preset time, contention resolution failure and retransmission of the preamble occurs and two adjacent transmissions of the preamble use a same beam, adding 1 to the power ramping counter; or when any of not correctly receiving the RAR message in the preset time, contention resolution failure and retransmission of the preamble occurs, two adjacent transmissions of the preamble use the same beam and the power ramping suspension instruction which is used to instruct the MAC layer by the physical layer is not received, adding 1 to the power ramping counter.

Optionally, when the computer programs are executed by the processor 301, following processing is implemented: when the power ramping counter is configured based on a single beam and the beams are switched at each retransmission, resetting the value of the power ramping counter corresponding to the current beam to that of the power ramping counter corresponding to a transmission beam, which is used to perform the previous transmission of the random access preamble.

Optionally, when the computer programs are executed by the processor 301, following processing is implemented: obtaining a transmission power of retransmission after ramping according to a formula PREAMBLE_RECEIVED_TARGET_POWER=preambleInitialReceivedTargetPowe r+DELTA_PREAMBLE+(POWER_RAMPING_COUNTER−1)*powerRampingStep;

where PREAMBLE_RECEIVED_TARGET_POWER denotes a target power value, preambleInitialReceivedTargetPower denotes an original power value, DELTA_PREAMBLE denotes a preset fixed value, POWER_RAMPING_ COUNTER denotes a value of the current power ramping counter and powerRampingStep denotes a power ramping step size;

the power ramping step size is configured by the base station for the terminal or determined by a preset rule.

Optionally, when a transmission power obtained via calculation is larger than or equals the maximum power and when the computer programs are executed by the processor 301, following processing is implemented: transmitting the random access preamble according to the maximum power.

Optionally, the at least two types of counters include: a beam preamble retransmission counter and a power ramping counter. When the computer programs are executed by the processor 301, following processing is implemented: obtaining a transmission power of retransmission after ramping according to a formula PREAMBLE_ RECEIVED_TARGET_POWER=preambleInitialReceivedTargetPowe r+DELTA_PREAMBLE+(POWER_RAMPING_COUNTER−1)*powerRampingStep;

where PREAMBLE_RECEIVED_TARGET_POWER denotes a target power value, preambleInitialReceivedTargetPower denotes an original power value, DELTA_PREAMBLE denotes a preset fixed value, POWER_RAMPING_ COUNTER denotes a value of the current power ramping counter and powerRampingStep denotes a power ramping step size;

the power ramping step size is configured by the base station for the terminal or determined by a preset rule.

Optionally, when the computer programs are executed by the processor 301, following processing is implemented: when any of not correctly receiving the RAR message in preset time, contention resolution failure and retransmission of the preamble occurs and two adjacent transmissions of the preamble use a same beam, adding 1 to the power ramping counter; or when any of not correctly receiving the RAR message in the preset time, contention resolution failure and retransmission of the preamble occurs, two adjacent transmissions of the preamble use the same beam and the power ramping suspension instruction which is used to instruct the MAC layer by the physical layer is not received, adding 1 to the power ramping counter.

Optionally, when the computer programs are executed by the processor 301, following processing is implemented: when the power ramping counter is configured based on a single beam and the beams are switched at each retransmission, resetting the value of the power ramping counter corresponding to the current beam to that of the power ramping counter corresponding to a transmission beam, which is used to perform the previous transmission of the random access preamble.

Optionally, when the computer programs are executed by the processor 301, following processing is implemented: when the random access preamble is transmitted on a first beam and the RAR message is not received in preset time, adding 1 to a beam preamble retransmission counter configured based on the first beam;

when a random access message three is transmitted on a second beam and the contention resolution fails, adding 1 to a beam preamble retransmission counter configured based on the second beam; or when the random access preamble is transmitted on a third beam, the random access message three is transmitted on a fourth beam and the contention resolution fails, adding 1 to a beam preamble retransmission counter configured based on the third beam, or respectively adding 1 to the beam preamble retransmission counter configured based on the third beam and a beam preamble retransmission counter configured based on the fourth beam.

Optionally, when a count value of the beam preamble retransmission counter reaches a second preset maximum number of times of transmission Max2 or Max2+1 and when the computer programs are executed by the processor 301, following processing is implemented:

when next retransmission of the random access preamble is performed in this random access procedure, switching beams;

when the next retransmission of the random access preamble is performed in this random access procedure, removing a beam, which is used to perform previous transmission of the random access preamble from candidate beams for next retransmission of the random access preamble; or notifying an upper layer of a random access problem or failure of the random access procedure via the MAC layer.

Optionally, when the computer programs are executed by the processor 301, following processing is implemented:

when count values of a first preset number of beam preamble retransmission counters reach a third preset maximum number of times of transmission Max3 or Max3+1, notifying an upper layer of a random access problem or failure of the random access procedure via the MAC layer; or when a sum of count values of a second preset number of beam preamble retransmission counters reaches the third preset maximum number of times of transmission Max3 or Max3+1, notifying the upper layer of the random access problem or the failure of the random access procedure via the MAC layer.

Optionally, the at least two types of counters include: a preamble transmission counter, a beam preamble retransmission counter and a power ramping counter. When the computer programs are executed by the processor 301, following processing is implemented: when the RAR message is not correctly received in preset time or the contention resolution fails, adding 1 to the preamble transmission counter.

Optionally, when the computer programs are executed by the processor 301, following processing is implemented: when a count value of the preamble transmission counter reaches a first preset maximum number of times of transmission Max1 or Max1+1, notifying an upper layer of a random access problem or failure of the random access procedure via the MAC layer.

Optionally, when the computer programs are executed by the processor 301, following processing is implemented: when the preamble transmission counter counts preamble retransmission and two adjacent transmissions of the preamble use a same beam, adding one step size to a transmission power; or when the two adjacent transmissions of the preamble use the same beam and the power ramping suspension instruction which is used to instruct the MAC layer by the physical layer is not received, adding one step size to the transmission power;

otherwise, keeping the transmission power unchanged;

wherein the step size is configured by the base station for the terminal or determined according to a preset rule.

Optionally, when the computer programs are executed by the processor 301, following processing is implemented: when the random access preamble is transmitted on a first beam and the RAR message is not correctly received in preset time, adding 1 to a beam preamble retransmission counter configured based on the first beam;

when a random access message three is transmitted on a second beam and the contention resolution fails, adding 1 to a beam preamble retransmission counter configured based on the second beam; or when the random access preamble is transmitted on the third beam, the random access message three is transmitted on a fourth beam and the contention resolution fails, adding 1 to a beam preamble retransmission counter configured based on the third beam, or respectively adding 1 to the beam preamble retransmission counter configured based on the third beam and a beam preamble retransmission counter configured based on the fourth beam.

Optionally, when a count value of the beam preamble retransmission counter reaches a second preset maximum number of times of transmission Max2 or Max2+1 and when the computer programs are executed by the processor 301, following processing is implemented: when next retransmission of the random access preamble is performed in this random access procedure, switching beams;

when the next retransmission of the random access preamble is performed in this random access procedure, removing a beam, which is used to perform previous transmission of the random access preamble from candidate beams for next retransmission of the random access preamble; or notifying an upper layer of a random access problem or failure of the random access procedure via the MAC layer.

Optionally, when the computer programs are executed by the processor 301, following processing is implemented: when count values of a first preset number of beam preamble retransmission counters reach a third preset maximum transmission times Max3 or Max3+1, notifying an upper layer of a random access problem or failure of the random access procedure via the MAC layer; or when a sum of count values of a second preset number of beam preamble retransmission counters reaches the third preset maximum number of times of transmission Max3 or Max3+1, notifying the upper layer of the random access problem or the failure of the random access procedure via the MAC layer.

Optionally, when the computer programs are executed by the processor 301, following processing is implemented: when any of not correctly receiving the RAR message in the preset time, contention resolution failure and retransmission of the preamble occurs and two adjacent transmissions of the preamble use the same beam, adding 1 to the power ramping counter; or when any of not correctly receiving the RAR message in the preset time, contention resolution failure and retransmission of the preamble occurs, two adjacent transmissions of the preamble use the same beam and the power ramping suspension instruction which is used to instruct the MAC layer by the physical layer is not received, adding 1 to the power ramping counter.

Optionally, when the computer programs are executed by the processor 301, following processing is implemented: when the power ramping counter is configured based on a single beam and the beams are switched at each retransmission, resetting the value of the power ramping counter corresponding to the current beam to that of the power ramping counter corresponding to a transmission beam, which is used to perform the previous transmission of the random access preamble.

Optionally, when the computer programs are executed by the processor 301, following processing is implemented: obtaining a transmission power of retransmission after ramping according to a formula PREAMBLE_RECEIVED_TARGET_POWER=preambleInitialReceivedTargetPowe r+DELTA_PREAMBLE+(POWER_RAMPING_COUNTER−1)*powerRampingStep;

where PREAMBLE_RECEIVED_TARGET_POWER denotes a target power value, preambleInitialReceivedTargetPower denotes an original power value, DELTA_PREAMBLE denotes a preset fixed value, POWER_RAMPING_ COUNTER denotes a value of the current power ramping counter and powerRampingStep denotes a power ramping step size;

the power ramping step size is configured by the base station for the terminal or determined by a preset rule.

Optionally, when an obtained transmission power is larger than or equals the maximum power and when the computer programs are executed by the processor 301, following processing is implemented: transmitting the random access preamble according to the maximum power.

Optionally, the at least two types of counters include: a preamble retransmission beam switching counter or a power level preamble transmission counter.

Optionally, when the computer programs are executed by the processor 301, following processing is implemented: when beams are switched when the preamble is re-transmitted, adding 1 to the preamble retransmission beam switching counter or power level preamble transmission counter.

Optionally, when the computer programs are executed by the processor 301, following processing is implemented: when the preamble retransmission beam switching counter or power level preamble transmission counter reaches a preset maximum number of times Max4 or Max4+1, then, performing power ramping when re-transmitting the random access preamble and resetting the preamble retransmission beam switching counter or power level preamble transmission counter;

at next retransmission of the random access preamble, keeping beams un-switched; or at the next retransmission of the random access preamble, switching to a beam, which has not been used to transmit the random access preamble, to re-transmit the random access preamble.

Optionally, when the computer programs are executed by the processor 301, following processing is implemented: an implementation mode of switching to the beam, which has not been used to transmit the random access preamble, to re-transmit the random access preamble includes:

switching to a beam that is in a same power level or preset number of power levels with the current beam and has not been used to transmit the random access preamble, to re-transmit the random access preamble.

Optionally, when the computer programs are executed by the processor 301, following processing is implemented: when the preamble retransmission beam switching counter or power level preamble transmission counter reaches the maximum count value and a current transmission power of a terminal reaches the maximum transmission power, notifying an upper layer of a random access problem or failure of the random access procedure via the MAC layer.

Optionally, when the computer programs are executed by the processor 301, following processing is implemented: when a transmission power used by a terminal for transmitting the preamble changes, resetting the preamble retransmission beam switching counter or power level preamble transmission counter.

The terminal 300 may implement each process, which is implemented by the terminal in the above embodiment. In order to avoid repetition, the terminal is not repeated here.

The terminal in embodiments of the present disclosure counts a number of times of preamble retransmission and/or a number of times of power ramping of transmission of the preamble according to a configured counter/counters in random access procedure when detecting that the RAR message is not correctly received or contention resolution fails. Therefore, the problem of being unable to simultaneously satisfy the functions of counting the power ramping and preamble transmission when a single counter is used for counting both the power ramping and preamble transmission, can be avoided. With the mode in the embodiments of the present disclosure, the reliability of communication of the NR system can be guaranteed.

Each embodiment in the description of the embodiments is described in a progressive manner. Each embodiment focuse on the differences with other embodiments, and the same and similar parts among each embodiment can be referred to each other.

A technical person in this field should understand that an embodiment of the present disclosure may be provided as methods, devices, or computer program products. Thus, the embodiments of the present disclosure may take the form of a complete hardware embodiment, a complete software embodiment, or a combination of software and hardware embodiments. Further, the embodiments of the present disclosure may take the form of a computer program product implemented on one or more computer available storage mediums (including, but not limited to, disk storage, CD-ROM, optical storage, etc.) containing computer available program codes.

Embodiments of the present disclosure are described by reference to the methods, terminal devices (systems), and the flow charts and/or block diagrams of the computer program products in embodiments of the present disclosure. It should be understood that each flow and/or block in the flowcharts and/or block diagrams and the combination of the flows and/or blocks in the flowcharts and/or block diagrams can be implemented by computer program instructions. These computer program instructions can be provided to the general-purpose computers, special-purpose computers, embedded processors or processors of other programmable data processing terminal devices to assemble a machine, so that computers or the processors of other programmable data processing terminal devices execute instructions to implement one or multiple flows in the flow chart and/or devices of designated functions of one or multiple blocks of the block diagram.

These program instructions can also be stored in the computer readable storage, which can boot the computers or other programmable data processing terminal devices to work in a particular way, so that instructions stored in the computer readable storage generate a manufacture of an instruction device. The instruction device is used to implement functions designated in one or multiple flows in a flow chart and/or one or multiple blocks in a block diagram.

The computer program instructions can be loaded into the computers or other programmable data processing terminal devices, so that a series of operations are executed on the computers or other programmable terminal devices to provide the processing implemented by the computer. Therefore, instructions executed on the computers or other programmable terminal devices are used to implement steps of designated functions in one or multiple flows in the flow chart and/or in one or multiple blocks in the block diagram.

Although preferred embodiments of the present disclosure have been described, technical personnel in the field may make additional changes and modifications to these embodiments once the basic creative concepts are known. Therefore, the attached claims are intended to be interpreted as including the preferred embodiments and all changes and modifications falling within the scope of the embodiments of the present disclosure.

It should be noted that, in the present disclosure, relational terms such as first and second are used only to distinguish one entity or operation from another and do not necessarily require or imply any such actual relationship or order between these entities or operations. Further, the term of "include", "comprise" or any variation thereof is intended to cover a non-exclusive contain. Therefore, processes, methods, materials and devices, which include a series of elements, not only include the elements, but also include other elements, which are not listed, or further include inherent elements of the processes, methods, materials and devices. In the absence of more restrictions, the elements defined by a statement "includes one" do not exclude that the processes, methods, materials and devices, which include these elements, also include additional same elements.

The foregoing only describes preferred embodiments of the present disclosure. It should be noted that an ordinary skilled in the art of the present disclosure can make any change or improvement made without departing from the principle of the present disclosure. These changes and improvements are also covered by the protection scope of the present disclosure.

What is claimed is:

1. A non-transitory computer readable storage medium, comprising computer programs stored therein; wherein the computer programs are executed by a processor to implement:

in a random access procedure, when detecting that no Random Access Response (RAR) is received or contention resolution fails, counting a number of times of retransmission of a preamble and/or a number of times of power ramping of transmission of the preamble according to a configured counter/counters;

wherein the configured counter/counters comprises the counter of one type; and the computer programs are executed by the processor to implement:

when the RAR message is not correctly received or the contention resolution fails, adding 1 to the counter; or when the RAR message is not correctly received or the contention resolution fails and a power ramping suspension instruction which is used to instruct a Medium Access Control (MAC) layer by a physical layer is not received, adding 1 to the counter;

wherein the counter/counters comprises a power ramping counter; and the computer programs are executed by the processor to implement:

when any of not correctly receiving the RAR message in preset time, contention resolution failure and retransmission of the preamble occurs and two adjacent transmissions of the preamble use a same beam, adding 1 to the power ramping counter; or when any of not correctly receiving the RAR message in the preset time, contention resolution failure and retransmission of the preamble occurs, two adjacent transmissions of the preamble use the same beam and the power ramping suspension instruction which is used to instruct the MAC layer by the physical layer is not received, adding 1 to the power ramping counter.

2. The non-transitory computer readable storage medium according to claim 1, wherein the counter/counters comprises: a preamble transmission counter.

3. The non-transitory computer readable storage medium according to claim 2, wherein when a count value of the preamble transmission counter reaches a first preset maximum number of times of transmission Max1 or Max1+1, the computer programs are executed by the processor to implement:

notifying an upper layer of a random access problem or failure of the random access procedure via the MAC layer.

4. The non-transitory computer readable storage medium according to claim 2, wherein the computer programs are executed by the processor to implement:

when the preamble transmission counter counts preamble retransmission, when two adjacent transmissions of the preamble use a same beam, adding one step size to a transmission power; or when the two adjacent transmissions of the preamble use the same beam and the power ramping suspension instruction which is used to instruct the MAC layer by the physical layer is not received, adding one step size to the transmission power;

otherwise, keeping the transmission power unchanged;

wherein the step size is configured by a base station for a terminal or determined according to a preset rule.

5. The non-transitory computer readable storage medium according to claim 4, wherein when an obtained transmission power is larger than or equals a maximum transmission power, the computer programs are executed by the processor to implement:

transmitting the random access preamble according to the maximum transmission power.

6. The non-transitory computer readable storage medium according to claim 1, wherein the computer programs are executed by the processor to implement:

when the power ramping counter is configured based on a single beam and the beams are switched at each retransmission, resetting a value of the power ramping counter corresponding to the current beam to a value of the power ramping counter corresponding to a transmission beam, which is used to perform the previous transmission of the random access preamble.

7. The non-transitory computer readable storage medium according to claim 1, wherein the computer programs are executed by the processor to implement:

obtaining a transmission power of retransmission after ramping according to a formula PREAMBLE_RECEIVED_TARGET_POWER=preambleInitialReceivedTargetPower+DELTA_PREAMBLE+(POWER_RAMPING_COUNTER−1)*powerRampingStep;

wherein PREAMBLE_RECEIVED_TARGET_POWER denotes a target power value, preambleInitialReceivedTargetPower denotes an original power value, DELTA_PREAMBLE denotes a preset fixed value, POWER_RAMPING_COUNTER denotes a value of the current power ramping counter and powerRampingStep denotes a power ramping step size;

the power ramping step size is configured by a base station for a terminal or determined by a preset rule.

8. The non-transitory computer readable storage medium according to claim 7, wherein when a transmission power obtained via calculation is larger than or equals a maximum power, the computer programs are executed by the processor to implement:

transmitting the random access preamble according to the maximum power.

9. A non-transitory computer readable storage medium, comprising computer programs stored therein; wherein the computer programs are executed by a processor to implement:

in a random access procedure, when detecting that no Random Access Response (RAR) is received or contention resolution fails, counting a number of times of retransmission of a preamble and/or a number of times of power ramping of transmission of the preamble according to a configured counter/counters;

wherein the configured counter/counters comprise: at least two types of counters;

the computer programs are executed by the processor to implement: when the counters reach a maximum number of times, notifying an upper layer of a random access problem or failure of the random access procedure via the MAC layer;

wherein the at least two types of counters comprise: a preamble transmission counter and a power ramping counter;

wherein the computer programs are executed by the processor to implement:

when any of not correctly receiving the RAR message in preset time, contention resolution failure and retransmission of the preamble occurs and two adjacent transmissions of the preamble use a same beam, adding 1 to the power ramping counter; or when any of not correctly receiving the RAR message in the preset time, contention resolution failure and retransmission of the preamble occurs, two adjacent transmissions of the preamble use the same beam and the power ramping suspension instruction which is used to instruct the MAC layer by the physical layer is not received, adding 1 to the power ramping counter.

10. The non-transitory computer readable storage medium according to claim 9, wherein the computer programs are executed by the processor to implement:

when the RAR message is not correctly received in preset time or the contention resolution fails, adding 1 to the preamble transmission counter.

11. The non-transitory computer readable storage medium according to claim 9, wherein when a count value of the preamble transmission counter reaches a first preset maximum number of times of transmission Max1 or Max1+1, the computer programs are executed by the processor to implement: notifying an upper layer of a random access problem or failure of the random access procedure via the MAC layer.

12. The non-transitory computer readable storage medium according to claim 9, wherein the computer programs are executed by the processor to implement:

when the preamble transmission counter counts preamble retransmission, when two adjacent transmissions of the preamble use a same beam, adding one step size to a transmission power; or when the two adjacent transmissions of the preamble use the same beam and the power ramping suspension instruction which is used to instruct the MAC layer by the physical layer is not received, adding one step size to the transmission power;

otherwise, keeping the transmission power unchanged;

wherein the step size is configured by a base station for a terminal or determined according to a preset rule.

13. The non-transitory computer readable storage medium according to claim 9, wherein the at least two types of counter/counters further comprises: a preamble retransmission beam switching counter or a power level preamble transmission counter.

14. The non-transitory computer readable storage medium according to claim 13, wherein the computer programs are executed by the processor to implement:

when beams are switched when the preamble is re-transmitted, adding 1 to the preamble retransmission beam switching counter or the power level preamble transmission counter.

15. The non-transitory computer readable storage medium according to claim 13, wherein when the preamble retransmission beam switching counter or the power level preamble transmission counter reaches a preset maximum number of times Max4 or Max4+1, the computer programs are executed by the processor to implement:

performing power ramping when re-transmitting the random access preamble and resetting the preamble retransmission beam switching counter or the power level preamble transmission counter;

at next retransmission of the random access preamble, keeping beams un-switched; or at the next retransmission of the random access preamble, switching to a beam, which has not been used to transmit the random access preamble, to re-transmit the random access preamble.

16. The non-transitory computer readable storage medium according to claim 15, wherein when switching to the beam, which has not been used to transmit the random access preamble, to re-transmit the random access preamble, the computer programs are executed by the processor to implement:

switching to a beam that is in a same power level or a preset number of power levels with the current beam and has not transmitted the random access preamble, to re-transmit the random access preamble.

17. The non-transitory computer readable storage medium according to claim 13, wherein the computer programs are executed by the processor to implement:

when the preamble retransmission beam switching counter or the power level preamble transmission counter reaches a maximum count value and a current transmission power of a terminal reaches a maximum transmission power, notifying an upper layer of a random access problem or failure of the random access procedure via the MAC layer.

18. The non-transitory computer readable storage medium according to claim 13, wherein the computer programs are executed by the processor to implement:

when a transmission power used by a terminal for transmitting the preamble changes, resetting the preamble retransmission beam switching counter or the power level preamble transmission counter.

19. A non-transitory computer readable storage medium, comprising computer programs stored therein; wherein the computer programs are executed by a processor to implement:

in a random access procedure, when detecting that no Random Access Response (RAR) is received or contention resolution fails, counting a number of times of retransmission of a preamble and/or a number of times of power ramping of transmission of the preamble according to a configured counter/counters;

wherein the configured counter/counters comprise: at least two types of counters; and the computer programs are executed by the processor to implement: when the counters reach a maximum number of times, notifying an upper layer of a random access problem or failure of the random access procedure via the MAC layer;

wherein the at least two types of counters comprise: a preamble transmission counter and a power ramping counter; and the computer programs are executed by the processor to implement:

obtaining a transmission power of retransmission after ramping according to a formula PREAMBLE_RECEIVED_TARGET_POWER=preambleInitialReceivedTargetPower+DELTA_PREAMBLE+(POWER_RAMPING_COUNTER−1)*powerRampingStep;

wherein PREAMBLE_RECEIVED_TARGET_POWER denotes a target power value, preambleInitialReceivedTargetPower denotes an original power value, DELTA_PREAMBLE denotes a preset fixed value, POWER_RAMPING_COUNTER denotes a value of the current power ramping counter and powerRampingStep denotes a power ramping step size;

the power ramping step size is configured by a base station for a terminal or determined by a preset rule.

20. The non-transitory computer readable storage medium according to claim 19, wherein when a transmission power obtained via calculation is larger than or equals a maximum power, the computer programs are executed by the processor to implement: transmitting the random access preamble according to the maximum power.

\* \* \* \* \*